United States Patent
Morishige et al.

(10) Patent No.: US 7,162,529 B2
(45) Date of Patent: Jan. 9, 2007

(54) SYSTEM USING MOBILE PROXY FOR INTERCEPTING MOBILE IP MESSAGE AND PERFORMING PROTOCOL TRANSLATION TO SUPPORT MULTIPLE COMMUNICATION PROTOCOLS BETWEEN MOBILE NETWORKS

(75) Inventors: Takehiro Morishige, Hachioji (JP); Hidenori Inouchi, Higashimurayama (JP); Yukiko Takeda, Tokorozawa (JP); Koji Tanaka, Yokohama (JP)

(73) Assignee: Hitachi, Ltd., Tokyo (JP)

(*) Notice: Subject to any disclaimer, the term of this patent is extended or adjusted under 35 U.S.C. 154(b) by 798 days.

(21) Appl. No.: 10/336,722

(22) Filed: Jan. 6, 2003

(65) Prior Publication Data
US 2003/0225900 A1    Dec. 4, 2003

(30) Foreign Application Priority Data
May 30, 2002    (JP)    .............................. 2002-156643

(51) Int. Cl.
*G06F 15/16*    (2006.01)
(52) U.S. Cl. .................................... 709/230; 709/245
(58) Field of Classification Search ................ 709/220, 709/221, 222, 226, 238, 245, 246, 230; 370/350, 370/338, 466, 352; 455/436; 707/103 R
See application file for complete search history.

(56) References Cited

U.S. PATENT DOCUMENTS

| | | | |
|---|---|---|---|
| 6,633,761 B1* | 10/2003 | Singhal et al. .............. 455/436 |
| 6,697,354 B1* | 2/2004 | Borella et al. .............. 370/352 |
| 6,769,000 B1* | 7/2004 | Akhtar et al. ........... 707/103 R |
| 6,839,338 B1* | 1/2005 | Amara et al. ................ 370/338 |
| 2001/0040895 A1* | 11/2001 | Templin ...................... 370/466 |
| 2002/0070417 A1* | 6/2002 | Nakatsugawa et al. ..... 370/338 |
| 2002/0071417 A1* | 6/2002 | Nakatsugawa et al. ..... 370/338 |
| 2002/0154624 A1* | 10/2002 | Oishi et al. .................. 370/350 |
| 2003/0110292 A1 | 6/2003 | Takeda et al. |
| 2003/0225912 A1* | 12/2003 | Takeda et al. .............. 709/246 |

FOREIGN PATENT DOCUMENTS

JP    2002-094546    9/2000

* cited by examiner

*Primary Examiner*—Le Hien Luu
(74) *Attorney, Agent, or Firm*—Reed Smith LLP; Stanley P. Fisher, Esq.; Juan Carlos A. Marquez, Esq.

(57) ABSTRACT

Since the Mobile IP is defined under the assumption that a mobile node roams between networks conforming to the same communications protocols, mobile communications between IPv4 and IPv6 are not possible. Further, a translation of the location registration messages also requires translating the format between different protocol layers. To solve this problem, a mobile proxy apparatus 2 is provided between a home network 1a and a foreign network 1b governed by different communications protocols. The mobile proxy apparatus 2 has a DNS-ALG function, a translator function and a Mobile IP function, and, by combining these functions, performs address translation and format translation on Mobile IP messages and user packets. The MN4 has Mobile IPv4 and Mobile IPv6 functions and executes communication suitable for the communications protocol governing the network to which it moves.

12 Claims, 23 Drawing Sheets

S41 MOBILE IPV6 BINDING UPDATE MESSAGE FORMAT

FIG.11

S22 MOBILE IPv6 BINDING ACKNOWLEDGEMENT MESSAGE FORMAT

IPv6 MOBILITY HEADER 140

| PAYLOAD PROTO | HEADER LENGTH | MH TYPE 6(BINDING ACKNOWLEDGEMENT) |
|---|---|---|
| CHECKSUM | | RESERVED |
| STATUS 141 | RESERVED | SEQUENCE NUMBER |
| LIFETIME | | |
| 142 REFRESH | | |
| PARAMETER | | |

S30 MOBILE IPv4 REGISTRATION REPLY MESSAGE FORMAT

FIG.14

200 BINDING CACHE TABLE

| REAL MN HOME ADDRESS | VIRTUAL MN HOME ADDRESS | MN-CoA | LIFETIME | SEQUENCE NUMBER | |
|---|---|---|---|---|---|
| | | | | | ~200-1 |
| | | | | | ~200-2 |
| | | | | | ~200-n |

300 ADDRESS TRANSLATION TABLE

| IPv4 ADDRESS (301) | IPv6 ADDRESS (302) | |
|---|---|---|
| mn4 | vmn6 | ~300-1 |
| vcn4 | cn6 | ~300-2 |
| dnsa4 | vdnsa6 | ~300-3 |
| vdnsb4 | dnsb6 | ~300-4 |
| ⋮ | | ~300-n |

F21 MOBILEIPV6→MOBILEIPV4 SIGNAL TRANSLATION ROUTINE

SYSTEM USING MOBILE PROXY FOR INTERCEPTING MOBILE IP MESSAGE AND PERFORMING PROTOCOL TRANSLATION TO SUPPORT MULTIPLE COMMUNICATION PROTOCOLS BETWEEN MOBILE NETWORKS

BACKGROUND OF THE INVENTION

1. Field of the Invention

The present invention relates to a scheme in a mobile communications system for interconnecting networks, each network conforming to different communications protocols, to provide a mobile communication. More particularly, the present invention relates to necessary address and protocol conversion methods for mobile terminals using a Mobile IP protocol to roam between IPv4 and IPv6 networks.

2. Description of the Related Art

In recent years vigorous studies have been under way to introduce an Internet Protocol (IP) into mobile communications networks. The Internet Engineering Task Force (IETF) has been working to standardize Mobile IPv6 and Mobile IPv4 specifications. Constitutional elements making up the Mobile IPv6 are a Mobile Node (hereinafter referred to as MN), a Home Agent (HA) and a Correspondent Node (CN). In the Mobile IPv4, a foreign agent (FA) is added to the constitutional elements of the Mobile IPv6.

The basic operation of the Mobile IP is described below. An MN is assigned a unique IP address (home address) that does not change even if the MN roams. Hence, applications activated on the MN are able to remain in operation without interruption as it moves. A network with the same network prefix as the home address is called a home network. When the MN moves to a foreign network other than the home network (or a local network), it acquires an IP address conforming to a communications protocol employed in the local network. This IP address is called a care of address.

The MN receives a Router Advertisement sent out periodically by routers or FA on the local network and detects a prefix different from the home address to learn that it has moved to a foreign network. Upon recognizing its entry into a foreign network, the MN sends the HA a location registration request message (Registration Request in the case of Mobile IPv4; Binding Update in the case of Mobile IPv6) that calls for packets destined to the MN's home address on the home network to be forwarded to it in its current location.

When the HA receives the location registration request message, the HA works as a proxy for the MN by creating a Binding Cache defining the association between the MN's home address and its care of address and broadcasting a packet intercepting message (Gratuitous ARP (Mobile IPv4); Gratuitous Neighbor Advertisement (Mobile IPv6)) for intercepting packets destined to the MN that has move to a foreign network.

The CN, a Correspondent Node of the MN, sends packets to the home address of the MN. The HA intercepts the packets destined to the MN's home address. The HA searches through the Binding Cache to obtain a care of address corresponding to the MN's home address. The HA attaches an IP header for the care of address to the original packets received (encapsulation) and send them out. The MN removes the encapsulated header for the care of address (decapsulation) to obtain the original packet that the CN has sent to the MN's home address.

With a rapid proliferation of IP networks, a technology for interconnecting networks having different address systems is gaining importance. For example, a method (IETF RFC1631) employing the Network Address Translator (NAT) is known that interconnects a link using a private address system and a link using a public address system.

The NAT performs conversion between the private IPv4 addresses and the public IPv4 addresses. The basic NAT changes either a source address or a destination address of a packet as it passes between two regions connected via a NAT router. When there is a conflict between the private network's address space and the public network's address space, a Twice NAT technology is often used to resolve the conflict.

The Twice NAT technology changes both of the source and destination addresses of a packet as it passes between two regions connected via a Twice NAT router. More specifically, the Twice NAT operates as follows. Before a Host-A in the private region initiates communication with a Host-B in the public region, the Host-A sends out a Host-B DNS address resolution packet. A DNS-ALG (Domain Name Service-Application Level Gateway) intercepts this packet, converts or translates the IP address for the Host-B into a virtual Host-B private IP address that is routable within the private region, and then returns the translated address to the Host-A. After the DNS address resolution is completed, the Host-A initiates communication with the virtual Host-B private IP address. When a packet passes through the Twice NAT, the Host-A's private IP address, which will serve as a source IP address, is changed into a public IP address contained in the NAT and a destination address is changed from the virtual Host-B's private IP address to a Host-B's real public IP address. A return packet from the Host-B undergoes the similar conversion. For details of the operation of the DNS-ALG, see IETF RFC2694.

Also important is a technology that interconnects networks that differ from each other not only in the address system but also in the communications protocol. Technologies are available that are commonly used to establish communication between a certain terminal belonging to one network and a correspondent terminal belonging to another network that has a different communications protocol from that of the former. Examples of such technologies include the NAT-PT (IETF RFC2766) and SOCKS64 (IETF RFC3089) which interconnect a network using the Internet Protocol version 4 (hereinafter referred to as an IPv4 network) and a network using the Internet Protocol version 6 (IPv6 network).

Both of these technologies basically translate the format of an IP packet between IPv4 and IPv6. For example, a conversion is done between an IPv4 address and IPv6 address. A device that performs this conversion is called a translator. The translator, before performing the conversion, is required to create an association (Binding Cache) between the IPv4 address and the IPv6 address and keep it. If this association is dynamically created each time a communication takes place, a DNS (domain name system) name resolution is used as a trigger for the dynamic creation of the association.

Almost all applications on the Internet today utilize the DNS to acquire an IP address of a correspondent node. The NAT and translator take advantage of this fact and always monitor the DNS message exchanged at the start of communication in order to use a name resolution request message as a trigger for creating translation information (IP address association, etc.). More specifically, when an IPv6 terminal requests a name resolution for a certain name and an IP address obtained as a result is an IPv4 address, this IPv4 address is changed to a virtual IPv6 address before being returned to the IPv6 terminal. Then, the former IPv4 address before being changed is associated with the translated virtual IPv6 address. As a result, the DNS-ALG can dynamically compose IP address translation information based on the IP address obtained in response to the name resolution request and on the translated IP address.

The DNS-ALG and the Twice NAT combined are a technology to interconnect networks having different address systems and a combination of the DNS-ALG and the translator is a technology essential to interconnect networks with different communications protocols. Still another important technology is JP-A-2002-94546 which can make the cooperation among the DNS-ALG, the Twice NAT and the translator scalable to reduce a load of the DNS-ALG in generating a virtual address for a destination terminal and to eliminate a large-capacity translation table.

These conventional technologies, however, assume that communicating terminals belonging to different networks are stationary terminals. Thus, in a mobile communication in which the terminals are Mobile IPs that are free to move to other networks, the address conversion using NAT is difficult to accomplish. JP-A-2002-94546 describes a mobile communication technology that links networks with different address systems. This technology realizes the network interconnection by the following means. A home agent (HA) and a foreign agent (FA), the constitutional elements of Mobile IPv4, are provided with a NAT function. When a MN moves to a new network and registers its location with the FA, the FA refers to the HA for a public IP address of the MN. The HA assigns a MN's public IP address and returns it to the FA, which then stores the MN's public IP address in the address translation function unit NAT.

The basic operation of the above-described Mobile IP is defined on the assumption that the MN moves between networks governed by the same protocol. Thus, when the MN whose home network uses IPv4 moves to an IPv6 network, the MN has no means to inform the home network of its care of address, rendering the mobile communication impossible.

Although formats of normal user packets can be converted between the home network and the local network by using the conventional technique that combines the DNS-ALG and the translator, the location registration message handled by the Mobile IPv4 and Mobile IPv6 have different protocol layers. More precisely, the Registration Request message of the Mobile IPv4 contains local network information in an UDP payload and the Binding Update message of the Mobile IPv6 contains it in an IPv6 header. Therefore, control signals handled by the Mobile IPs need to be converted between packet formats in different protocol layers.

Another problem with the Mobile IP is that, when a Correspondent Node (CN) present in the local network into which the MN moved sends a packet to the MN, it is not directly sent to the MN in the same network but forwarded via the HA because a destination IP address of the packet sent out is the MN's home address and because the care of address of the MN is managed by the HA. This renders the packet routing redundant.

An object of the present invention is to provide an environment that enables a mobile communication by securing a mobility of terminals between networks with different communications protocols and different address systems.

Another object of the present invention is to provide an environment that enables a communication with optimum routing in a local network to which a mobile terminals has moved.

SUMMARY OF THE INVENTION

To solve the problems described above, the present invention offers at least the following three provisions in addition to the conventional protocol translation method that makes combined use of a DNS-ALG and a translator as described in JP-A-2002-94546, that is, (1) To interconnect networks governed by different communications protocols, a mobile proxy apparatus is installed between these networks and is provided with a means to process the Mobile IP protocol that enables mobile communications service and with a function to convert a message between different protocol layers;

(2) the mobile proxy apparatus has a DNS-ALG function that provides an address resolution service between different networks; and (3) the Mobile IP-enabled mobile node has a means for processing Mobile IPv4 and Mobile IPv6 control signals and also a means for sending a location registration message to the mobile proxy apparatus according to the communications protocol of the network to which the mobile node has moved.

Further, the mobile proxy apparatus and the HA may have a means which, upon receiving a Mobile IP control signal, creates information necessary to establish communication between the mobile node and the correspondent node and makes settings for an external device.

Other objects, features and advantages of the invention will become apparent from the following description of the embodiments of the invention taken in conjunction with the accompanying drawings.

BRIEF DESCRIPTION OF THE DRAWINGS

FIG. 11 illustrates a format of a Mobile IPv6 Binding Acknowledgement message.

FIG. 14 illustrates entries in a Binding Cache table 200.

FIG. 15 illustrates entries in an address translation table 300.

DETAILED DESCRIPTION OF THE EMBODIMENTS

An embodiment of the present invention will be described by referring to the accompanying drawings.

Figure 1:
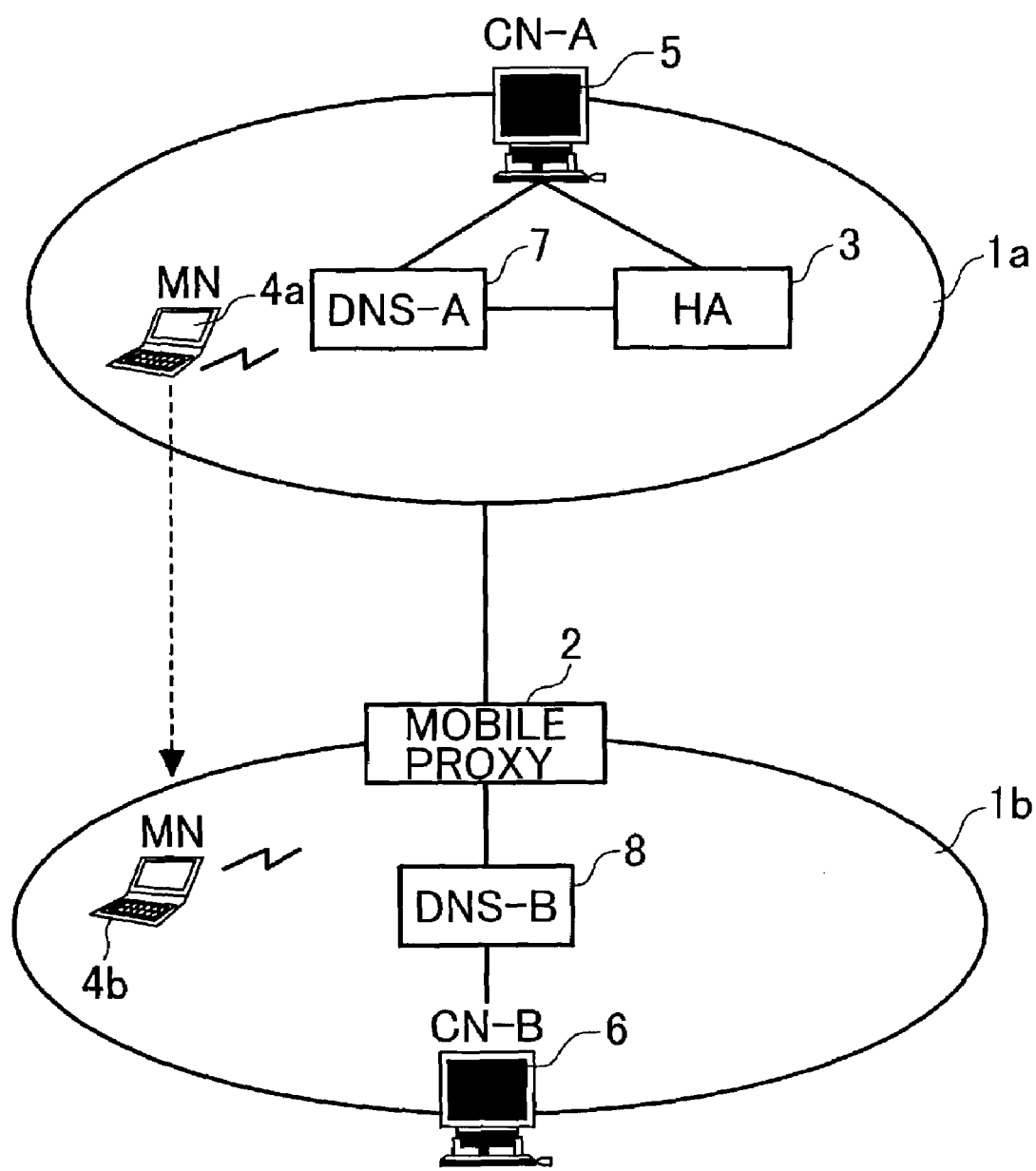
FIG. 1 is a schematic diagram showing an example configuration of a communications network according to the present invention.

FIG. 1 shows an example configuration in which a terminal present in a home network or a terminal in a foreign network communicates with a mobile node (MN) conforming to a Mobile IP when the MN enters the foreign network governed by a communications protocol different from that used in the home network.

A network 1 comprises a home network 1a to which a MN4 belongs and a foreign network 1b to which the MN4 moves. The home network 1a has a terminal CN-A5 as a correspondent node for the MN4, a home agent HA3 which manages location information on the MN4, intercepts a packet destined from the CN-A5 to the MN4 and forwards it to the MN4b, and a DNS-A7 for managing an association between IP addresses and domain names of terminals present in the home network 1a. The foreign network 1b has a terminal CN-B6 as a correspondent node for the MN4b that has moved to the foreign network 1b, a mobile proxy apparatus 2 that intercepts a Mobile IP message exchanged between the MN4b and the HA3 and performs protocol translation on the message and relaying of the protocol-translated message, and a DNS-B8 for managing an association between IP addresses and domain names of terminals present in the foreign network 1b.

Figure 2:
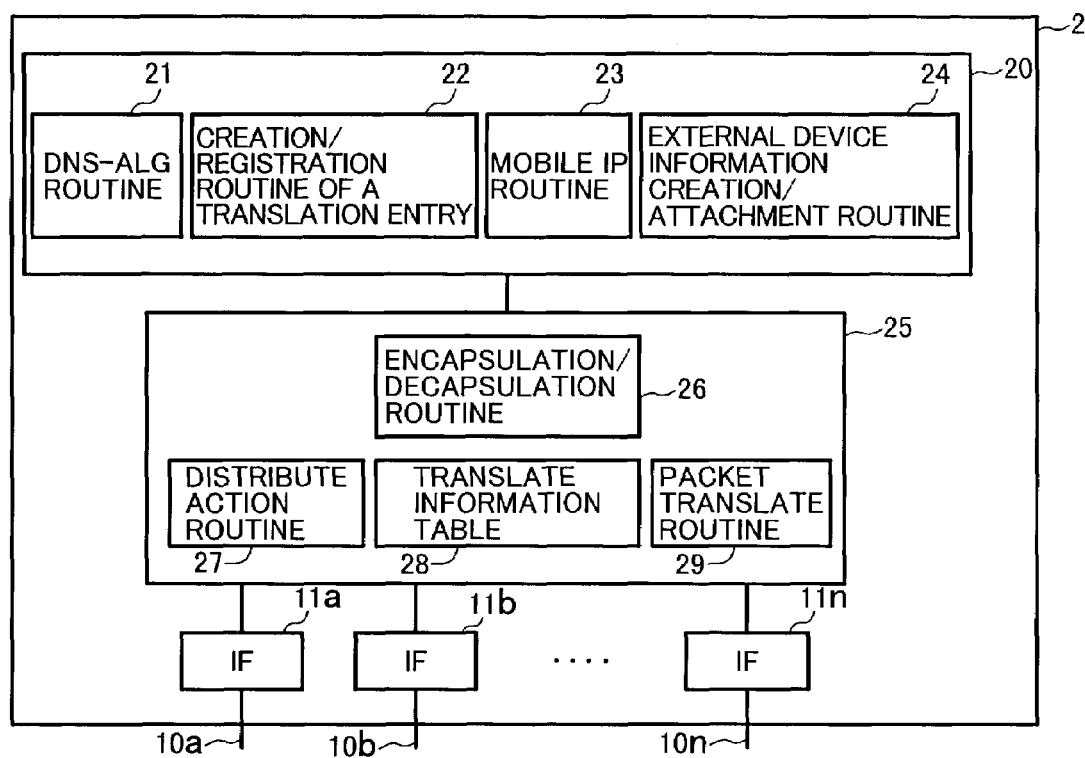
FIG. 2 is a block diagram of a mobile proxy apparatus 2.

FIG. 2 shows an example configuration of the mobile proxy apparatus 2. The mobile proxy apparatus 2 has an interface unit 11 (IF) (11a, 11b, . . . , 11n) including a line (10a, 10b, . . . , 10n), a packet forwarding processing unit 25 and a packet forwarding control unit 20.

The packet forwarding processing unit 25 comprises a distribute action routine 27 for detecting a DNS message and a Mobile IP message and distributing data to associated routines in the packet forwarding control unit 20, a translate information table 28 for storing information necessary for address translation, a packet translation routine 29 for performing a protocol translation and an address translation on a data packet, and a encapsulation/decapsulation routine 26 for adding an IP header to or removing it from the data packet.

The translate information table 28 has an address translation table 300 as shown in FIG. 15. The address translation table 300, in the case of FIG. 15, contains an association between an IPv4 address 301 and an IPv6 address 302 using different protocols. Alternatively, the table may store an association between an IPv4 private address and an IPv4 public address with different address systems.

The packet translation routine 29 uses the address translation table 300, for example, in converting the IPv4 address into the IPv6 address when it receives an IPv4 packet and in converting the IPv6 address into the IPv4 address when it receives an IPv6 packet. In addition to performing the address conversion, the packet translation routine 29 also performs conversion between an IPv6 packet format shown in FIG. 5 and an IPv4 packet format shown in FIG. 6. The packet forwarding control unit 20 has a DNS-ALG routine 21, a translation entry creation/registration routine 22, a Mobile IP routine 23, and an external device information creation/attachment routine 24.

The DNS-ALG routine 21 intercepts a DNS message passing through the mobile proxy apparatus 2 to provide an address resolution between networks governed by different communications protocols.

The Mobile IP routine 23 has a similar function to that of the foreign agent (FA) in processing the Mobile IP protocol and provides a mobile communication service based on the Mobile IP between networks with different communications protocols by intercepting the Mobile IP messages as they pass through the mobile proxy apparatus 2. The Mobile IP routine 23 has a Binding Cache table 200, as shown in FIG. 14, which contains an association among a real MN home address 201, which is used at least in the home network 1a of the MN4b that exists in a foreign network, a virtual MN home address 202 valid only in the foreign network 1b, a MN care of address 203 used by the MN4b in the foreign network 1b, a Lifetime 204 containing a valid period of an entry 200-1 regarding the MN4b in the Binding Cache table 200, and a sequence number 205 used for authenticating a Registration Request message sent by the MN4b.

The translation entry creation/registration routine 22 has an address pool for converting IPv6 (IPv4) addresses into ones that can be routed in the IPv4 (IPv6) network and also a function to create address translation information. This routine registers the address translation information with the translate information table 28 upon receiving a translated address creation/registration request from the DNS-ALG routine 21 or the Mobile IP routine 23.

The external device information creation/attachment routine 24 has a function which, triggered by a message passing through the mobile proxy apparatus 2, creates information needed to communicate with an external device connected to the mobile proxy apparatus 2 and attaches the created information to the external device. An example case of this invention in which the external device information creation/attachment routine 24 is activated is when the mobile proxy apparatus 2, upon receiving a Registration Request message from the MN4b, associates the virtual home address of MN4b with the domain name, creates a DNS registration message and sets it in the DNS-B8.

Figure 3:
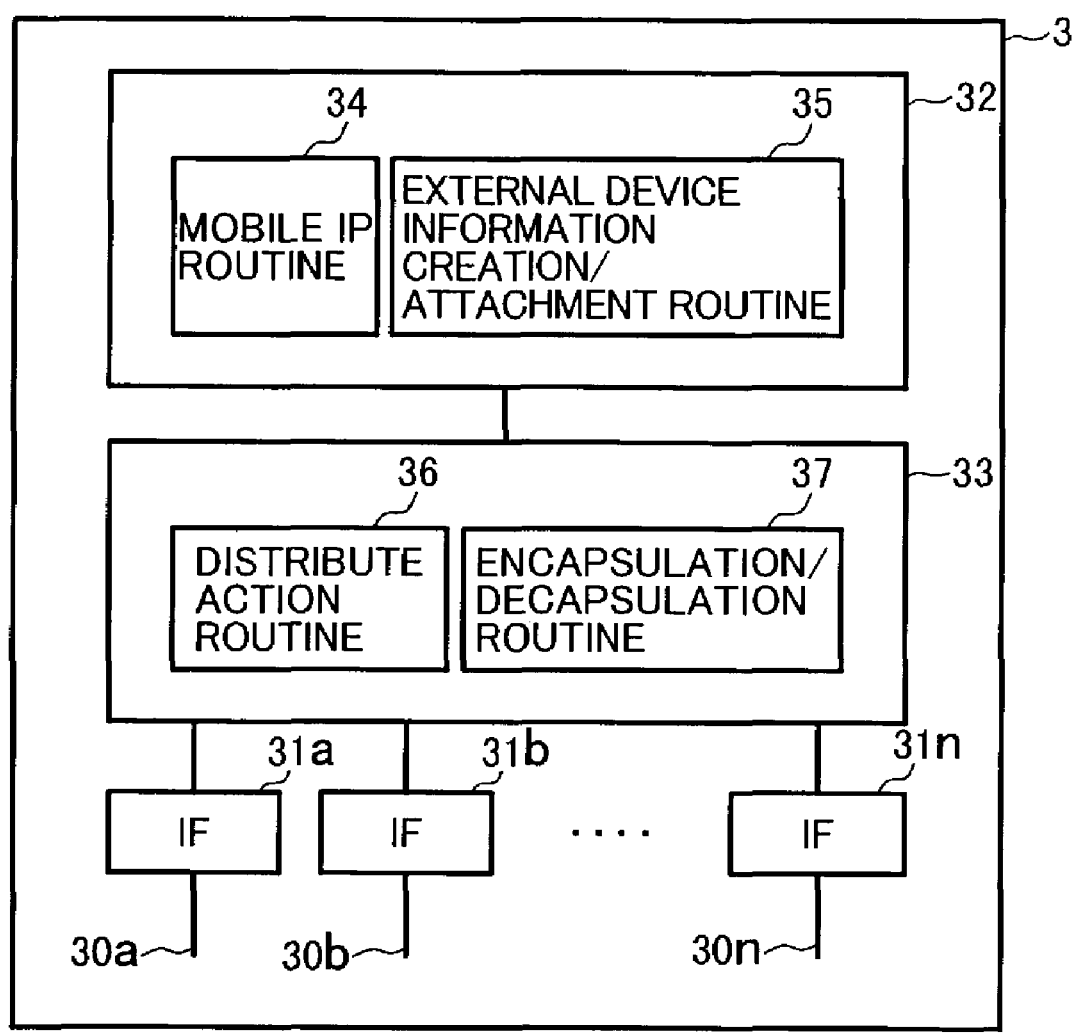
FIG. 3 is a block diagram of HA3.

FIG. 3 shows an example configuration of HA3 installed in the home network 1a of MN4. The HA3 has an interface unit 31 (IF) (31a, 31b, . . . , 31n), a packet forwarding processing unit 33, and a packet forwarding control unit 32.

The packet forwarding processing unit 33 has a distribute action routine 36 for mainly detecting Mobile IP messages and distributing data to associated routines in the packet forwarding control unit 32, and an encapsulation/decapsulation routine 37 for adding an IP header to or removing it from a data packet.

The packet forwarding control unit 32 has a Mobile IP routine 34 and an external device information creation/attachment routine 35. The Mobile IP routine 34 has a function of home agent (HA) for processing the Mobile IP protocol. The Mobile IP routine 34 also has a Binding Cache table 200, as shown in FIG. 14, and stores therein an association among a MN home address 201 used at least in the home network 1a for the MN4b that exists in a foreign network, a MN care of address 203 used by the MN4b in the foreign network 1b, a Lifetime 204 containing a valid period of an entry 2001 concerning the MN4b in the Binding Cache table 200, and a sequence number 205 used for authenticating a Registration Request message sent by the MN4b.

The external device information creation/attachment routine 35 has a function to create information, necessary for the MN to perform a mobile communication, and attach the information to the external device. In this invention, example cases where the external device information creation/attachment routine 35 is activated include the following scenarios. A first scenario occurs when it is necessary to register beforehand an IP address and a domain name of HA3 with the DNS-A7 in the home network 1a so that when the MN4b moves to the foreign network it is able to acquire a virtual IP address of the HA 3 that is only valid in the local network. Similarly, to be able to acquire a virtual home address of the MN4 when the CN-B6 present in the foreign network 1b starts to communicate with the MN4 requires registering in advance the IP address and domain name of the MN4 with the DNS-A7 present in the home network 1a. This is a second scenario. This problem can be solved as follows. The HA3, when booted, may associate its own IP address with its domain name, create a DNS registration message and set it in the DNS-A7. Alternatively, the HA3, triggered by the location registration by the MN4b, may associate a MN4b's IP address with its domain name, create a DNS registration message and set it in the DNS-A7.

Figure 4:
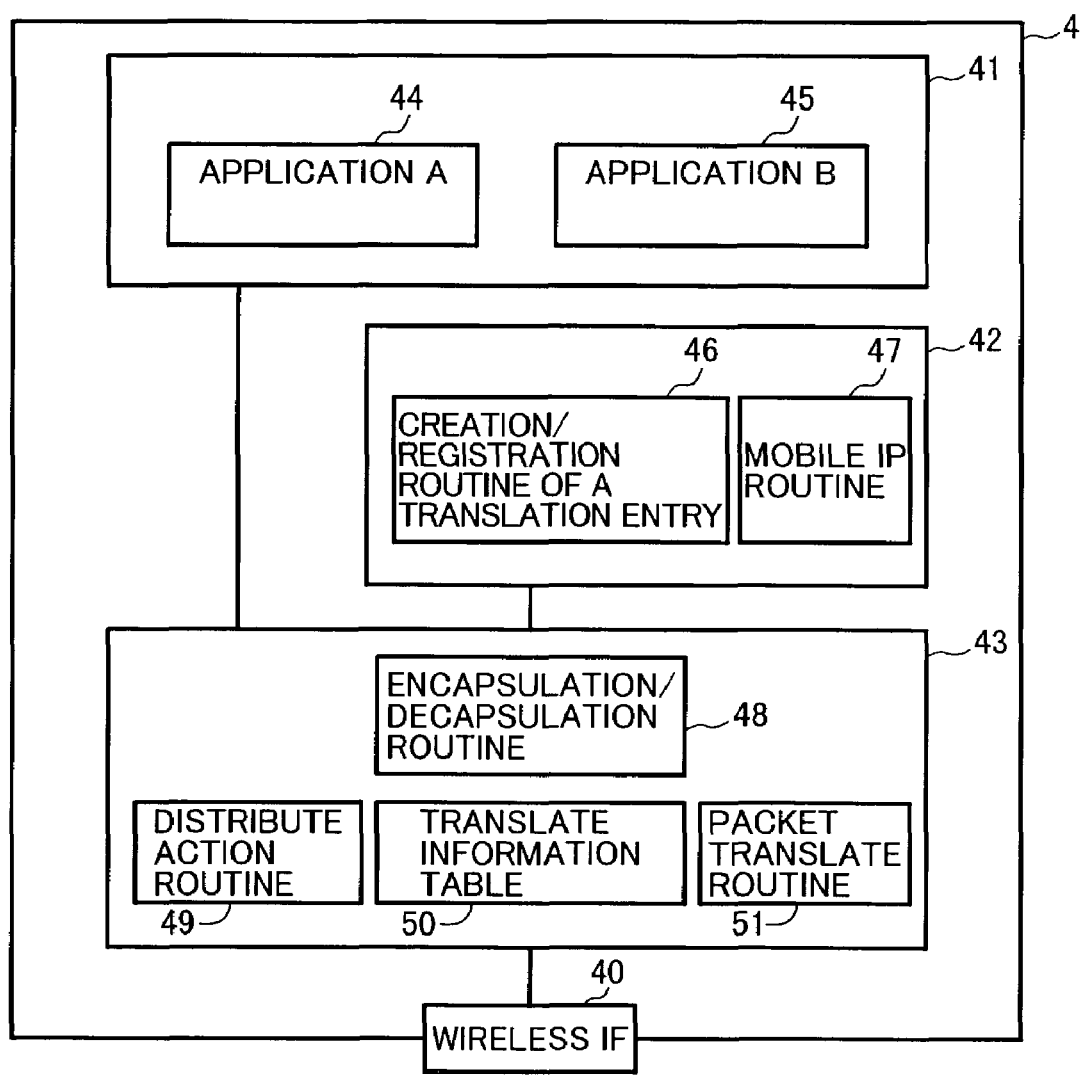
FIG. 4 is a block diagram of MN4.

FIG. 4 shows an example configuration of the MN4. The MN4 comprises a wireless interface unit 40 for receiving a wireless signal, a packet forwarding processing unit 43, a packet forwarding control unit 42, and a memory unit 41 where applications (44, 45) run.

The packet forwarding processing unit 43 has a distribute action routine 49 for analyzing received packets and distributing data to associated routines for the next processing, a translate information table 50 for storing information necessary for address translation, a packet translation routine 51 for performing a protocol translation and an address translation on a data packet, and an encapsulation/decapsulation routine 48 for adding an IP header to or removing it from the data packet.

The translate information table 50 has an address translation table 300 as shown in FIG. 15.

The packet translation routine 51 utilizes the address translation table 300. When it receives an IPv4 packet destined to the IPv4 care of address of the MN4b, the packet translation routine 51 converts the IPv4 care of address into an IPv6 home address that the MN4 uses in the home network 1a. In addition to performing the address conversion, the packet translation routine 51 also performs conversion between an IPv6 packet format and an IPv4 packet format.

The packet forwarding control unit 42 has a translation entry creation/registration routine 46 and a mobile IP routine 47. The mobile IP routine 47 has the Mobile IPv4 and Mobile IPv6 functions of a mobile node (MN) for processing the Mobile IP protocol.

The translation entry creation/registration routine 46 has a function of creating address translation information used to convert an IPv6 (IPv4) address into an address that is routable in the IPv4 (IPv6) network. Triggered by a translated address creation/registration request from the mobile IP routine 47, the translation entry creation/registration routine 46 registers the address translation information with the translate information table 50.

Applications (44, 45) that operate in the memory unit 41 are running at all times at the home address used in the home network 1a. Packets sent or received in the local network are processed by the packet forwarding processing unit 43 and the packet forwarding control unit 42 so that the packets have an address system or communications protocol that enables communication in the local network.

Now, an operation procedure of the mobile communication according to the present invention will be described in detail as follows. In a representative case of FIG. 1, it is assumed that the home network 1a to which the MN4 belongs is an IPv4 network and that a foreign network to which the MN4 moves is an IPv6 network. For an opposite situation in which the MN4 moves from the IPv6 network to the IPv4 network, additional explanations will be given, as necessary, where different operations are performed.

Figure 16:
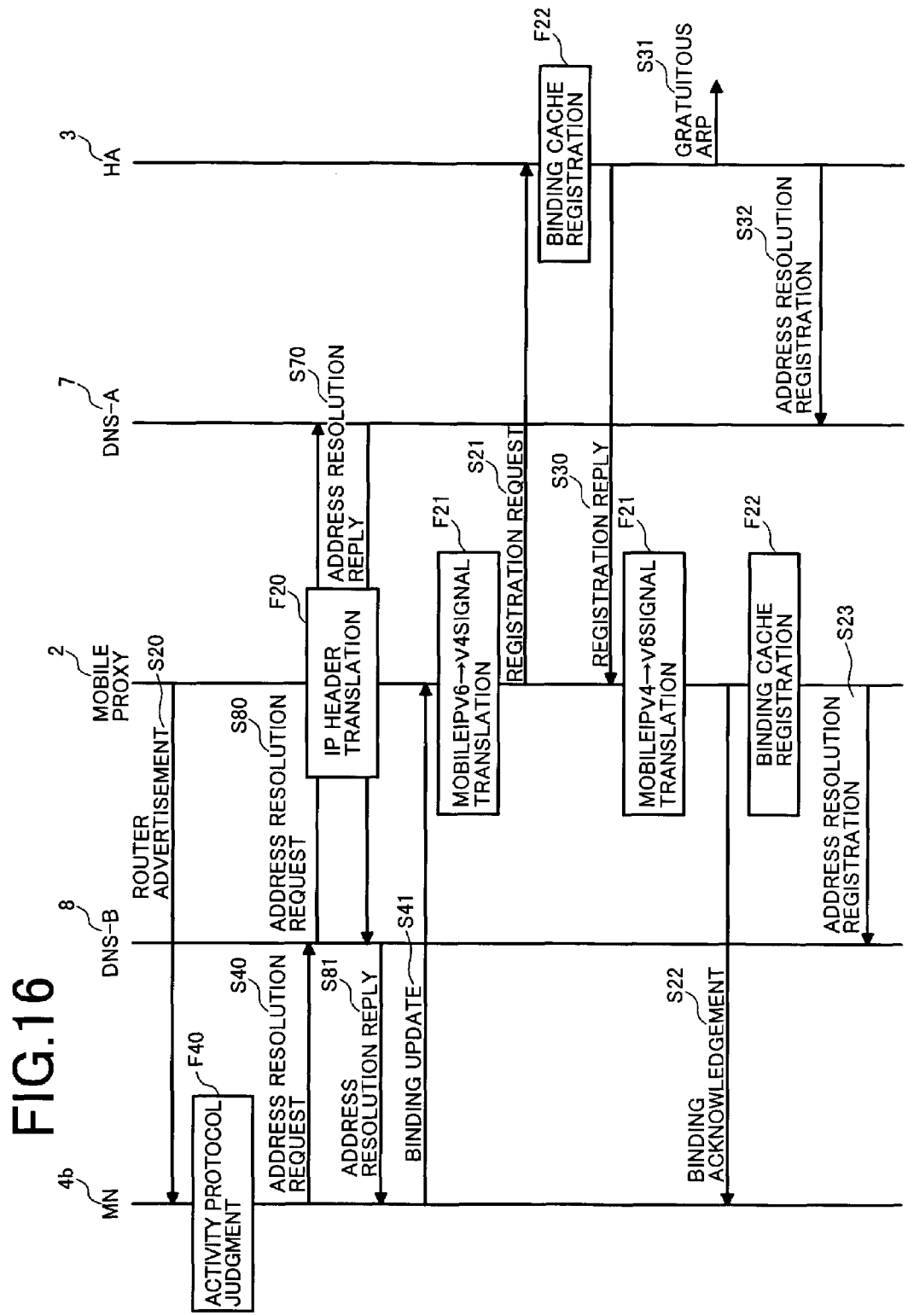
FIG. 16 illustrates a Registration Request sequence performed by MN4 as it roams.

FIG. 16 shows a sequence of operations performed to send a location registration message to the HA3 present in the home network 1a when the MN4 moves to a foreign network 1b. First, the MN4b that has moved to the foreign network 1b receives a Router Advertisement sent out periodically by the mobile proxy apparatus 2 installed in the foreign network 1b to learn that it has moved to a foreign network (S20). The MN4b also examines an IP header in the Router Advertisement to determine the communications protocol that governs the foreign network 1b and composes a care of address used in the foreign network 1b (F40).

Figure 6:
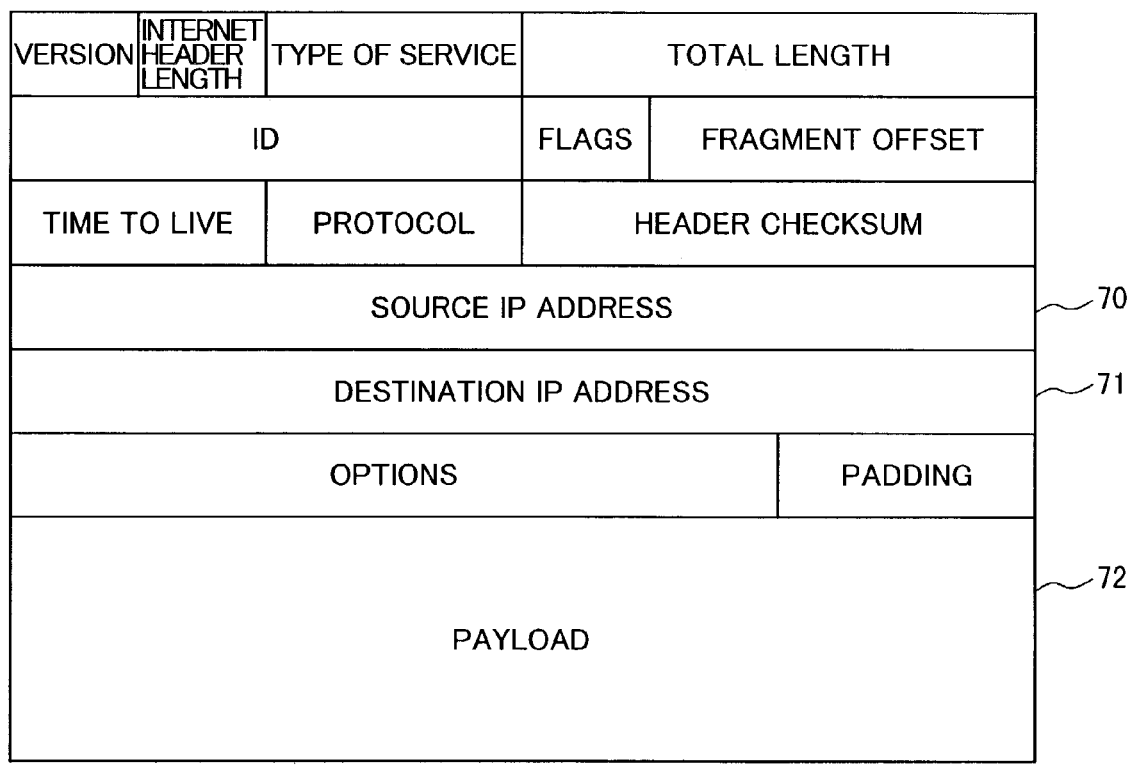
FIG. 6 illustrates an IPv4 packet format.
Figure 7:
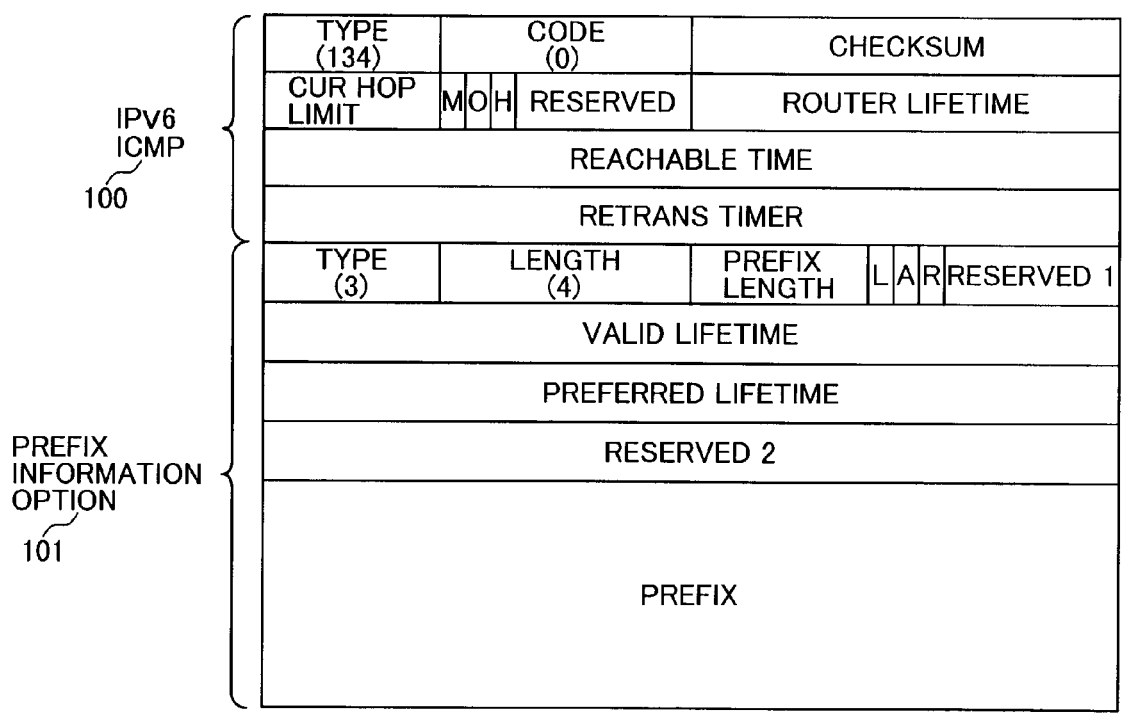
FIG. 7 illustrates a format of an IPv6 Router Advertisement message.
Figure 8:
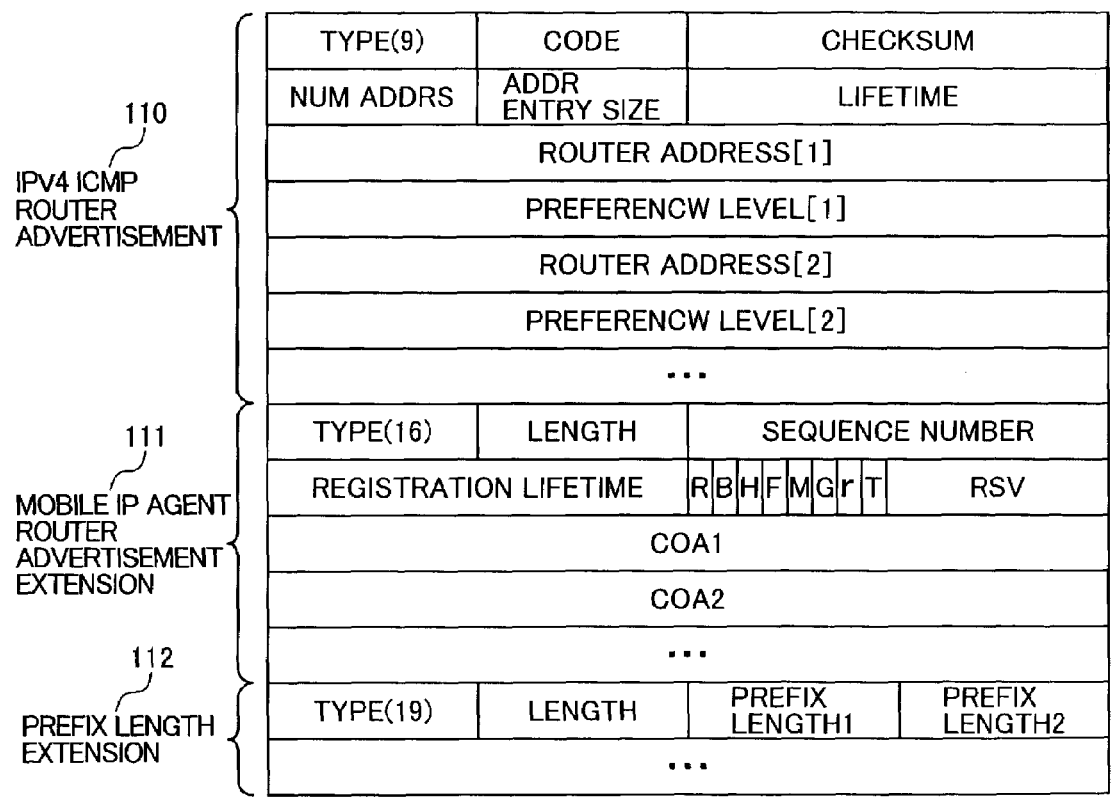
FIG. 8 illustrates a format of an IPv4 Router Advertisement message.

FIG. 7 and FIG. 8 show Router Advertisement message formats of IPv6 and IPv4, respectively. The Router Advertisement messages are stored in Payload fields (63, 72) in the IPv6 and IPv4 packet formats shown in FIG. 5 and FIG. 6.

When the MN4b moves to the IPv6 network, it receives an IPv6 Router Advertisement shown in FIG. 7 and creates an IPv6 care of address the MN4b uses in the foreign network 1b by using an IP address contained in Prefix Length and Prefix of Prefix Information Option 101.

When, on the other hand, the MN4b moves to the IPv4, it receives an IPv4 Router Advertisement shown in FIG. 8 and selects an IPv4 care of address the MN4b uses in the foreign network 1b from COA fields in Mobile IP Agent Advertisement Extension.

Returning to FIG. 16, the explanation about the location registration sequence will be continued. The MN4b that has composed its care of address sends a location registration message to the HA3 installed in the home network 1a. However, since the IP address (IPv4) of the HA3 held by the MN4b is an IP address that is only valid in the home network 1a, the location registration message sent from the foreign network 1b to the HA3 cannot reach its destination. Thus, as a preprocedure before sending the location registration message, the MN4b sends a HA3 Address Resolution Request message to the DNS-B8 installed in the foreign network 1*b* to acquire a virtual IP address (IPv6) of HA3 that is valid in the foreign network 1*b* (S40). In addition to the virtual IP address (IPv6) of HA3, it is also possible to acquire a virtual IP address (IPv6) of the MN4 itself that is valid in the foreign network 1*b*.

For the address resolution procedure using DNS and the packet format, see IETF RFC1035 and IETF RFC1886.

Since the DNS-B8 that has received the Address Resolution Request message from the MN4b does not have an association between the IP address and the domain name of the HA3, the DNS-B8 relays the Address Resolution Request message to the DNS-A7 installed in the home network 1*a* (S80). Because the Address Resolution Request dispatched from the DNS-B8 needs to follow the communications protocol of the foreign network 1*b*, it is sent to a virtual IPv6 address of the DNS-A7. Here, the mobile proxy apparatus 2 performs conversion on the IP header to enable a packet communication between the foreign network 1*b* and the home network 1*a* (F20).

Figure 19:
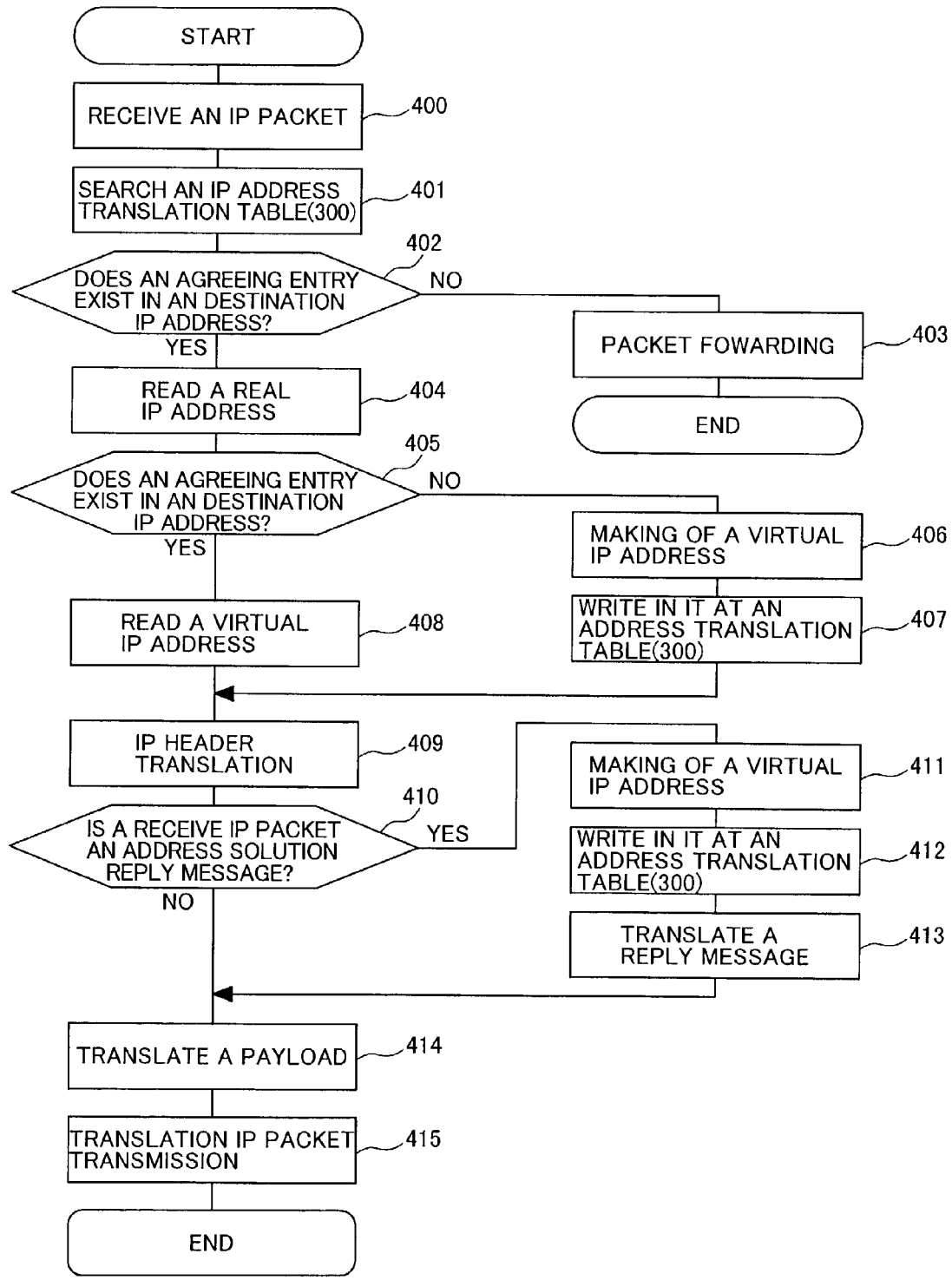
FIG. 19 is a flow diagram showing an IPv4-IPv6 header translation routine performed by the mobile proxy apparatus 2.

Referring to FIG. 19, an IP header translation routine (F20) performed by the mobile proxy apparatus 2 will be explained. First, after having received an IP packet (400), the routine looks up the address translation table 300 shown in FIG. 15 (401) to check if an entry 300-*n* exists that contains the IP address set in a destination address of the received IP packet (402). If the corresponding entry 300-*n* does not exist, the IP address set in the destination address of the received IP packet is a real IP address. Thus, the packet is forwarded without executing the IP header translation routine (403) which is then ended. Conversely, if the corresponding entry 300-*n* exists, this means that the IP address set in the destination address is a virtual IP address and thus this routine picks up a real IP address corresponding to the virtual IP address from the address translation table 300 (404).

Similarly, a check is made to see if there is an entry in the address translation table 300 that contains the IP address set in a source address of the received IP packet (405). If the corresponding entry 300-*n* does not exist, an virtual IP address for this IP address is created (406) and stored in the address translation table 300 (407) because the IP address set in the source address of the received IP packet is an IP address that cannot be forwarded in the next network where it is to be forwarded. Conversely, if the corresponding entry 300-*n* exists, a virtual IP address corresponding to the source IP address is extracted (408). Next, based on the destination address and source address extracted or created in the procedure described above, the IP header of the received IP packet is translated (409). Then, a protocol number in the Payload field of the received IP packet is examined to see if the received IP packet is an Address Resolution Reply message (410). If it is not the Address Resolution Reply message, the format of data contained in the Payload field is translated (414) and the translated IP packet is sent (415) before ending the IP header translation routine. If the received IP packet is the Address Resolution Reply message, a virtual IP address corresponding to the real IP address contained in the reply message is created (411) and stored in the address translation table 300 (412). Then, the packet is converted into an Address Resolution Reply message containing the composed virtual IP address (413), the format of data contained in the Payload field is translated (414), and the translated IP packet is transmitted (415). Now the IP header translation routine is terminated.

While the IP header translation procedure described above enables communication between networks governed by different communications protocols, such as IPv4 and IPv6, the communication can also be made possible between networks with the same communications protocols but with different address systems by storing in the address translation table 300 an association between IPv4 private addresses and IPv4 public addresses.

Returning to FIG. 16, the explanation about the location registration sequence will be continued. The Address Resolution Request message, which was sent by the IP header translation routine (F20) of the mobile proxy apparatus 2 to the virtual IPv6 address of the DNS-A7, has its destination IP address converted into a real IPv4 address of the DNS-A7 and also has its source address or real IPv6 address of the DNS-B8 converted into a virtual IPv4 address that can be routed in the home network 1*a*. As a result, the Address Resolution Request message that was dispatched in the IPv6 packet from the DNS-B8 is converted into an IPv4 packet and delivered to the DNS-A7.

The DNS-A7 extracts an IPv4 address corresponding to the domain name of HA3 contained in the Address Resolution Request message and sends the Address Resolution Reply message to the virtual IPv4 address of the DNS-B8 (S70). The mobile proxy apparatus 2 intercepts the Address Resolution Reply message and has the IP header translation routine (F20) convert the Address Resolution Reply message sent in the IPv4 packet from the DNS-A7 into an IPv6 packet for transmission to the DNS-B8. Further, during the process of the IP header translation routine (F20), an entry of association between the real IPv4 address of HA3 and the virtual IPv6 address of HA3 returned to the DNS-B8 is created in the address translation table 300 stored in the mobile proxy apparatus 2.

The DNS-B8 associates the virtual IPv6 address of HA3 contained in the Address Resolution Reply message with the domain name of HA3 and stores the association, and then sends the Address Resolution Reply message containing the virtual IPv6 address of HA3 to the MN4b (S81).

While in the above the MNb4 has been described to acquire the virtual IP address of HA3 or MN4b itself in the foreign network 1*b* by using the DNS, it is possible to make settings in advance in the mobile proxy apparatus 2.

Having acquired the virtual IPv6 address of HA3, the MN4b now sends the Binding Update message to the HA3 (S41).

Figure 9:
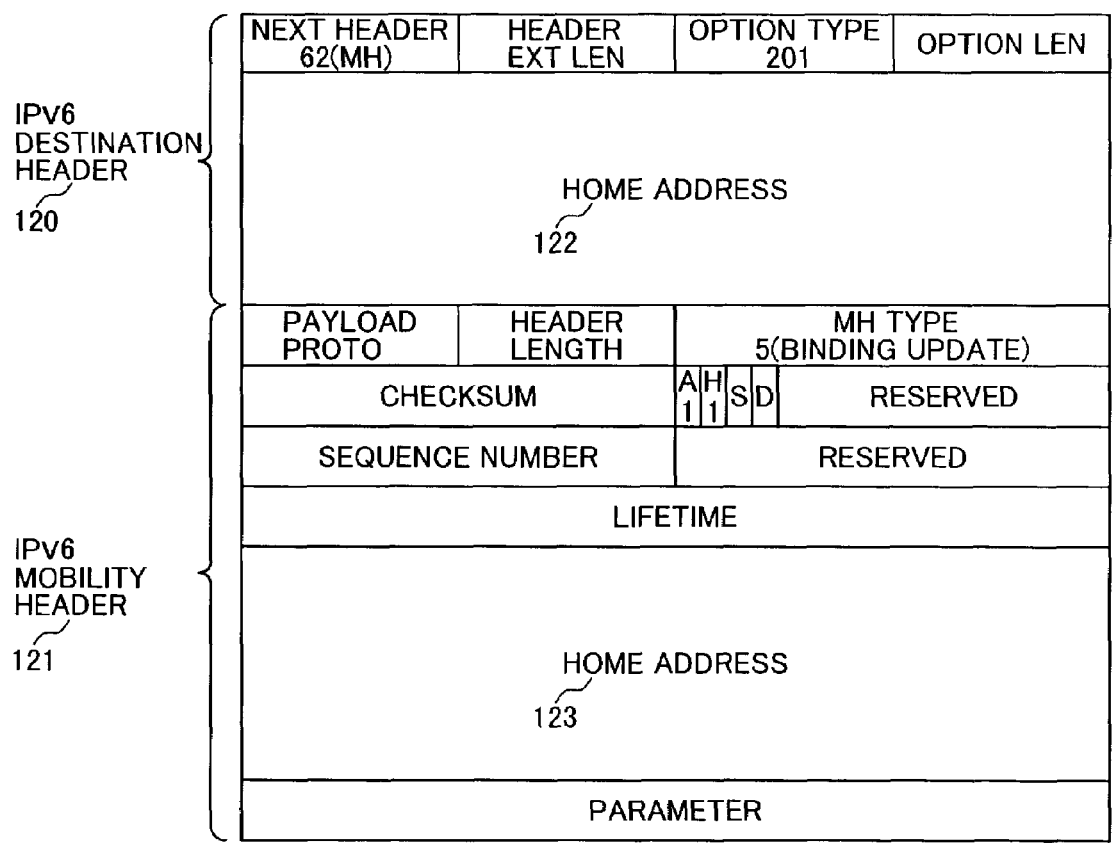
FIG. 9 illustrates a format of a Mobile IPv6 Binding Update message.

FIG. 9 shows an example format of a Mobile IPv6 Binding Update message sent to the HA3 when the MN4b, whose home network 1*a* is an IPv4 home network, moves to an IPv6 network. An IPv6 Destination Header 120 is stored in an Extension Header field 62 of the IPv6 packet format shown in FIG. 5. An IPv6 Mobility Header 121 is stored in a Payload field 63 of the IPv6 packet format shown in FIG. 5. The IP address of HA3 to which the MN4b belongs is stored in a Destination Address field 61 of the IPv6 packet format shown in FIG. 5. In this embodiment, the IP address of HA3 contains a virtual IPv6 address. The care of address of MN4b is stored in a Source Address field 60 of the IPv6 packet format shown in FIG. 5. The home address of MN4b is stored in a Home Address field 122 of the IPv6 Destination Header 120 and a Home Address field 123 of the IPv6 Mobility Header 121 shown in FIG. 9. At this time, since the home address of the MN4b that has moved from the IPv4 home network 1*a* is an IPv4 address, it is required that the home address to be stored in the Home Address fields (122, 123) in the location registration message of the IPv6 packet shall be changed to an IPv6 address.

Figure 13:
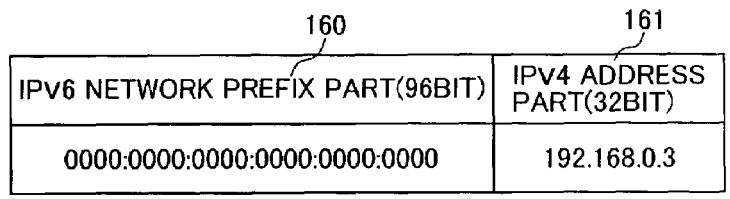
FIG. 13 illustrates a format of an IPv4 mapped IPv6 address system.

To solve this problem three methods are possible. The first is to set the virtual IPv6 address of MN4 in the MN4 and mobile proxy apparatus 2 in advance. The second is to acquire the virtual IPv6 address of MN4 using the DNS in the same way that the virtual IPv6 address of HA3 is obtained. The third is to use an IPv4 mapped IPv6 address as shown in FIG. 13. The IPv4 mapped IPv6 address comprises an IPv6 Prefix part 160 made up of upper 96 bits of a total of 128 bits and having all 96 bits set to zero, and an IPv4 Address part 161 made up of lower 32 bits and set with an IPv4 address. In this invention, the real IPv4 home address of MN4 is put in the IPv4 address field 161 of this IPv4 mapped IPv6 address which is to be set in the Binding Update message.

Figure 10:
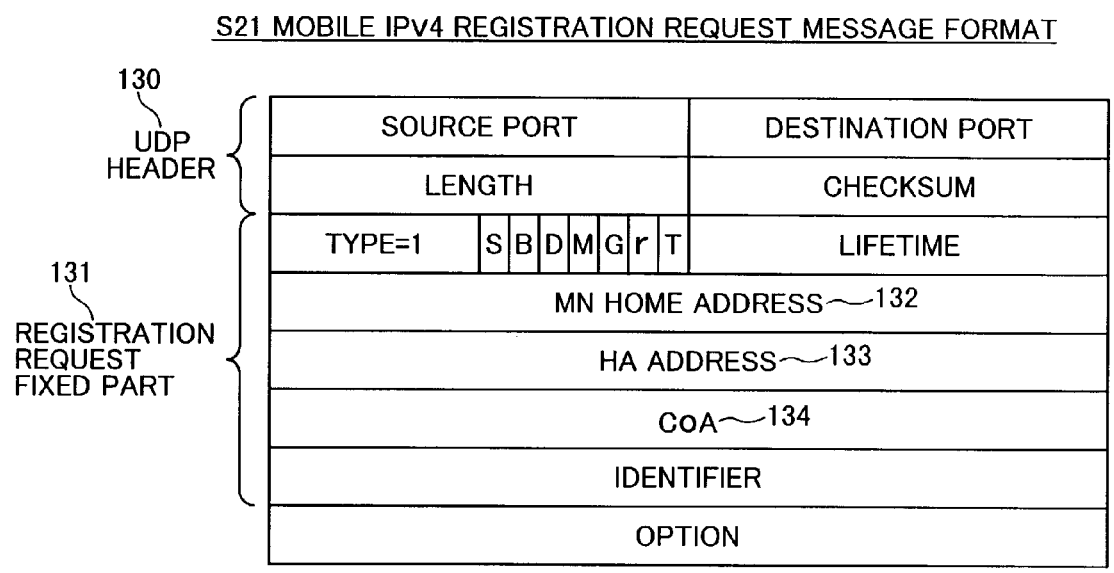
FIG. 10 illustrates a format of a Mobile IPv4 Registration Request message.

An example format of a Registration Request message transmitted in the IPv4 network is shown in FIG. 10. The Registration Request message is stored in a Payload field 72 of the IPv4 packet format shown in FIG. 6 and includes a UDP Header part 130 and a Registration Request fixed part 131.

In the configuration in which the MN4b moves from an IPv6 home network 1a to an IPv4 foreign network 1b, the virtual IPv4 home address of MN4b is stored in a MN Home Address field 132 shown in FIG. 10, the virtual IPv4 address of HA3 is stored in a HA Address field 133 of FIG. 10, and the care of address of MN4b contains the IP address retrieved from the care off address field in the Router Advertisement of FIG. 8 periodically advertised by the mobile proxy apparatus 2.

Returning to FIG. 16, the explanation of the location registration sequence will be continued. The Binding Update message that was sent in the communications protocol of the foreign network 1b (S41) is intercepted by the mobile proxy apparatus 2, which in turn translates the Binding Update message into a Registration Request message conforming to the communications protocol of the home network 1a (F21) and sends it to the HA3 (S21).

Figure 20:
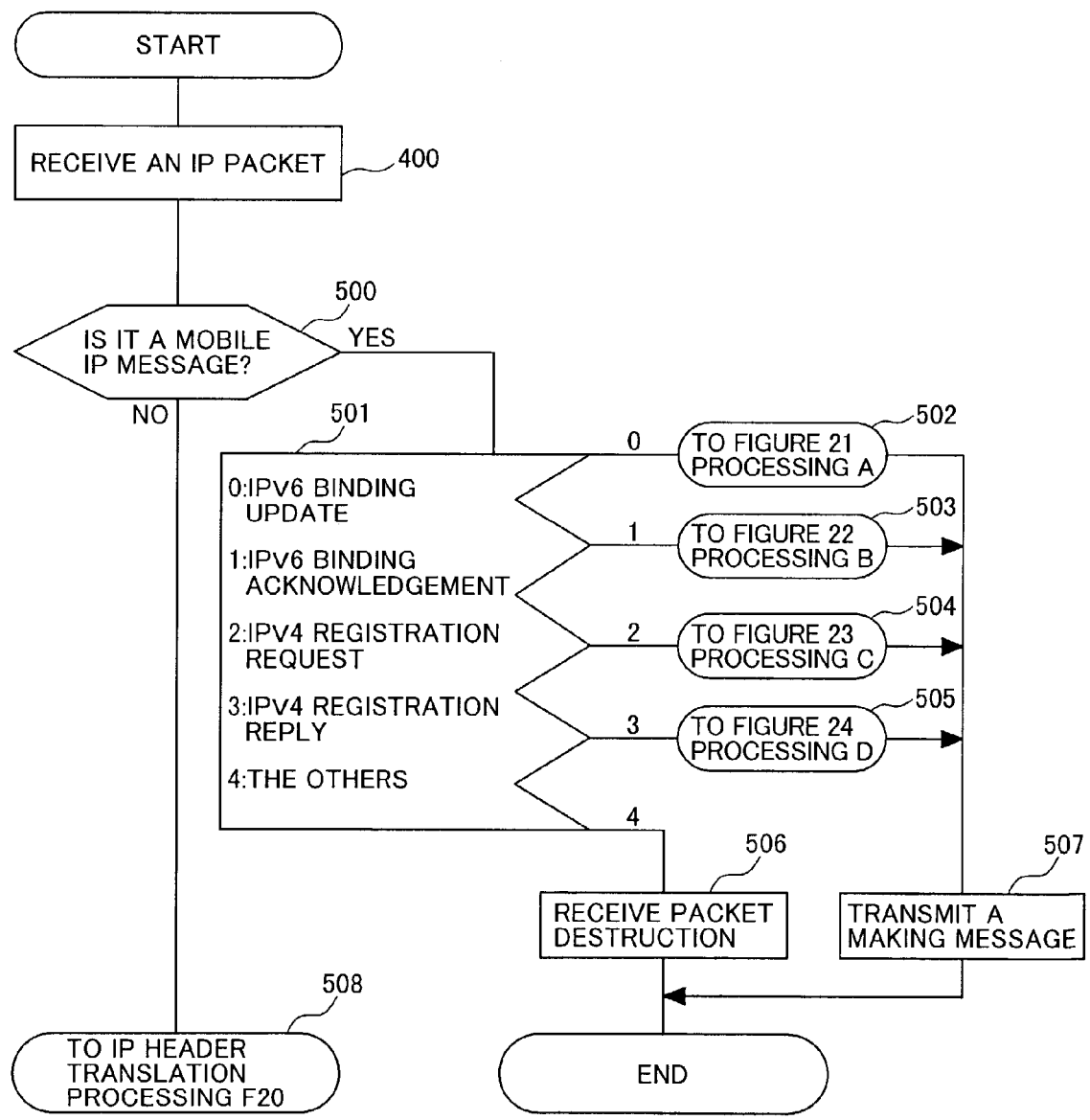
FIG. 20 is a flow diagram showing a Mobile IPv4-Mobile IPv6 message translation routine performed by the mobile proxy apparatus 2.
Figure 21:
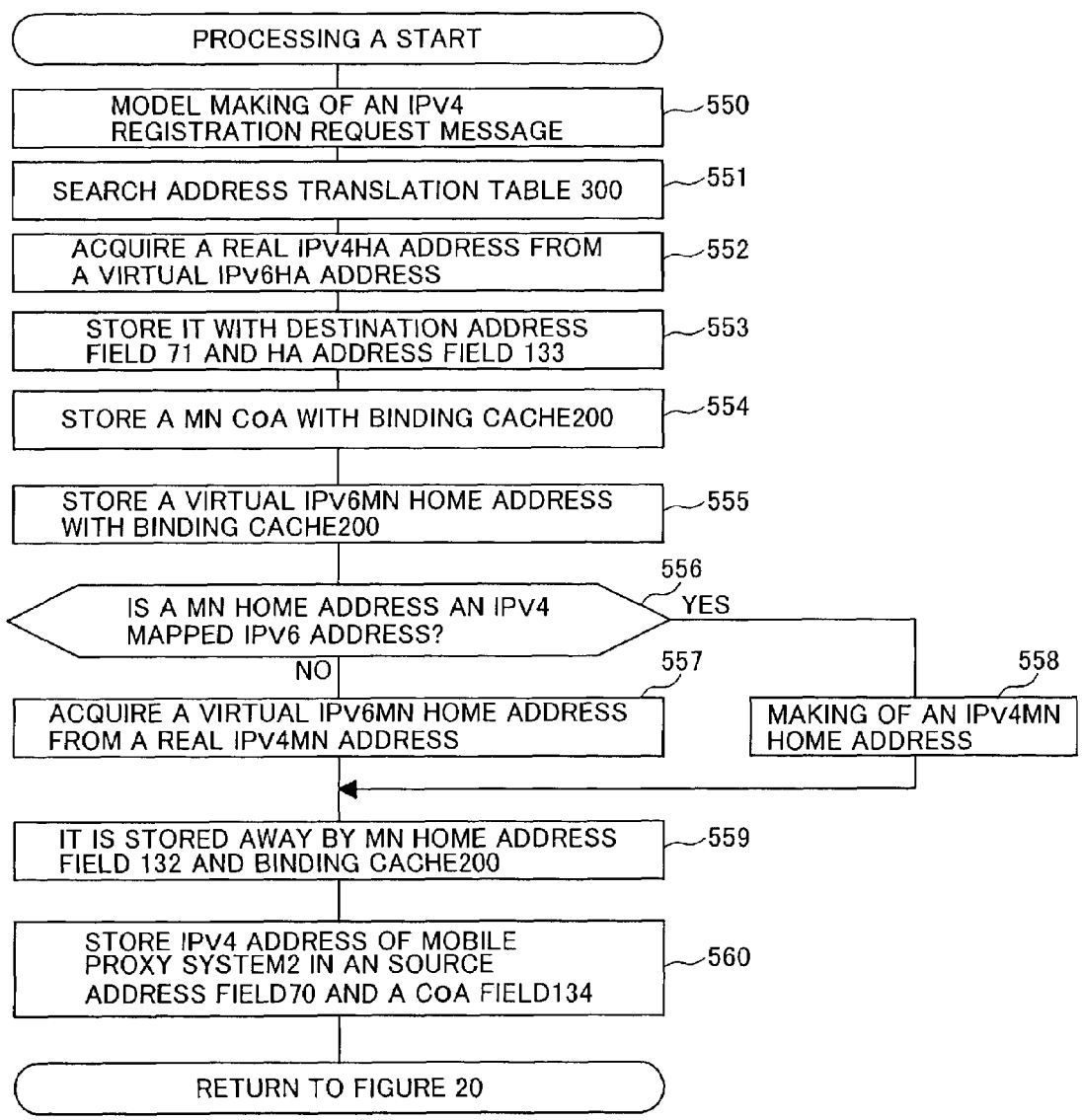
FIG. 21 is a flow diagram showing a translation routine performed by the mobile proxy apparatus 2 to convert a Mobile IPv6 Binding Update message into a Mobile IPv4 Registration Request message.

Referring to FIG. 20 and FIG. 21, we will describe the translation routine (F21) performed by the mobile proxy apparatus 2 to translate a Mobile IPv6 Binding Update message into a Mobile IPv4 Registration Request message. The Mobile IPv6 Binding Update message packet sent by the MN4b is intercepted by the mobile proxy apparatus 2 (400). A check is made to see if the received IP packet is a Mobile IP message (500). When the received IP packet is not a Mobile IP message, the IP header translation routine (F20) of FIG. 19 is executed. If it is a Mobile IP message, the category and communications protocol of the message are examined (501). Messages other than the Mobile IP Binding Update or Binding Acknowledgement message are not targets for translation and their packets are rejected, ending the translation routine (506).

Figure 5:
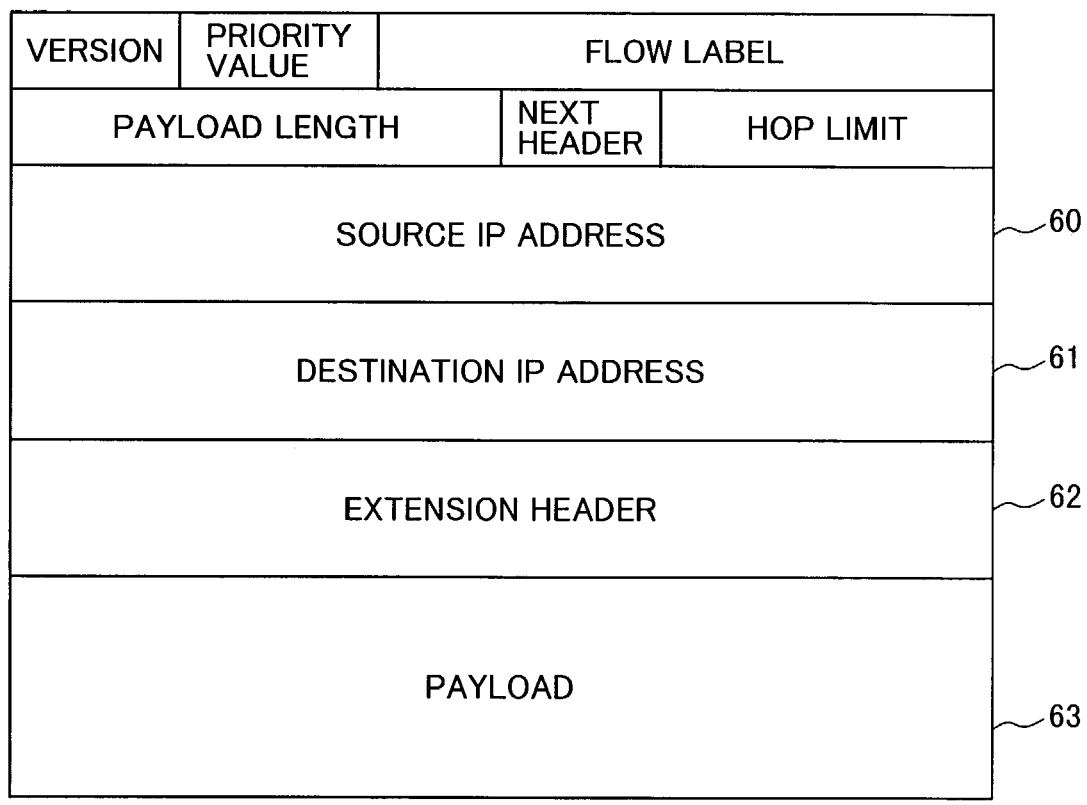
FIG. 5 illustrates an IPv6 packet format.

Here, since the message is the IPv6 Binding Update message, the procedure shown in FIG. 21 is continued (502). Based on the IPv4 packet format of FIG. 6 and the Mobile IPv4 Registration Request message format of FIG. 10, a model of an IPv4 Registration Request message is created (550). Next, the address translation table 300 is looked up for conversion of the IP address (551). From the address translation table 300, a real IPv4 address of HA3 is acquired which corresponds to the virtual IPv6 HA address contained in the Destination Address field 61 shown in FIG. 5 (552). The real IPv4 address of HA3 is then stored in the Destination Address field 71 of FIG. 6 and the HA Address field 133 of FIG. 10 (553). Next, the IPv6 address of HA3 contained in the Source Address field 60 of FIG. 5 is stored in the MN care of address entry 203 of the Binding Cache 200 shown in FIG. 14. The virtual IPv6 MN home address contained in the Home Address field 123 of FIG. 9 is also stored in the virtual MN home address entry 202 of the Binding Cache 200 (555). Next, to acquire a real IPv4 home address of MN4b, the Home Address field (123) of FIG. 9 is looked up to examine whether the virtual IPv6 MN home address has an IPv6 mapped IPv4 address structure as shown in FIG. 13 (556). This can be determined by checking if all the 96 bits of IPv6 Prefix part 160 are zero. If the virtual IPv6 MN home address has the IPv6 mapped IPv4 address structure, the real IPv4 home address is composed using the lower 32 bits (558). If not, the real IPv4 home address of MN4b corresponding to the virtual IPv6 MN home address is retrieved from the address translation table 300 (557). Then, the composed or acquired real IPv4 home address of MN4b is stored in the real home address entry 201 of the Binding Cache 200 shown in FIG. 14 and in the MN Home Address field 132 shown in FIG. 10 (559). As a final step, the IPv4 address of the mobile proxy apparatus 2 is stored in the Source Address field 70 shown in FIG. 6 and in the care of address field 134 shown in FIG. 10 (560). The IPv4 Registration Request message composed by the above processing is sent to the HA3 in the home network 1a (507). Now, the translation routine for translating the Mobile IPv6 Binding Update message into the Mobile IPv4 Registration Request message (F21) is terminated.

Figure 23:
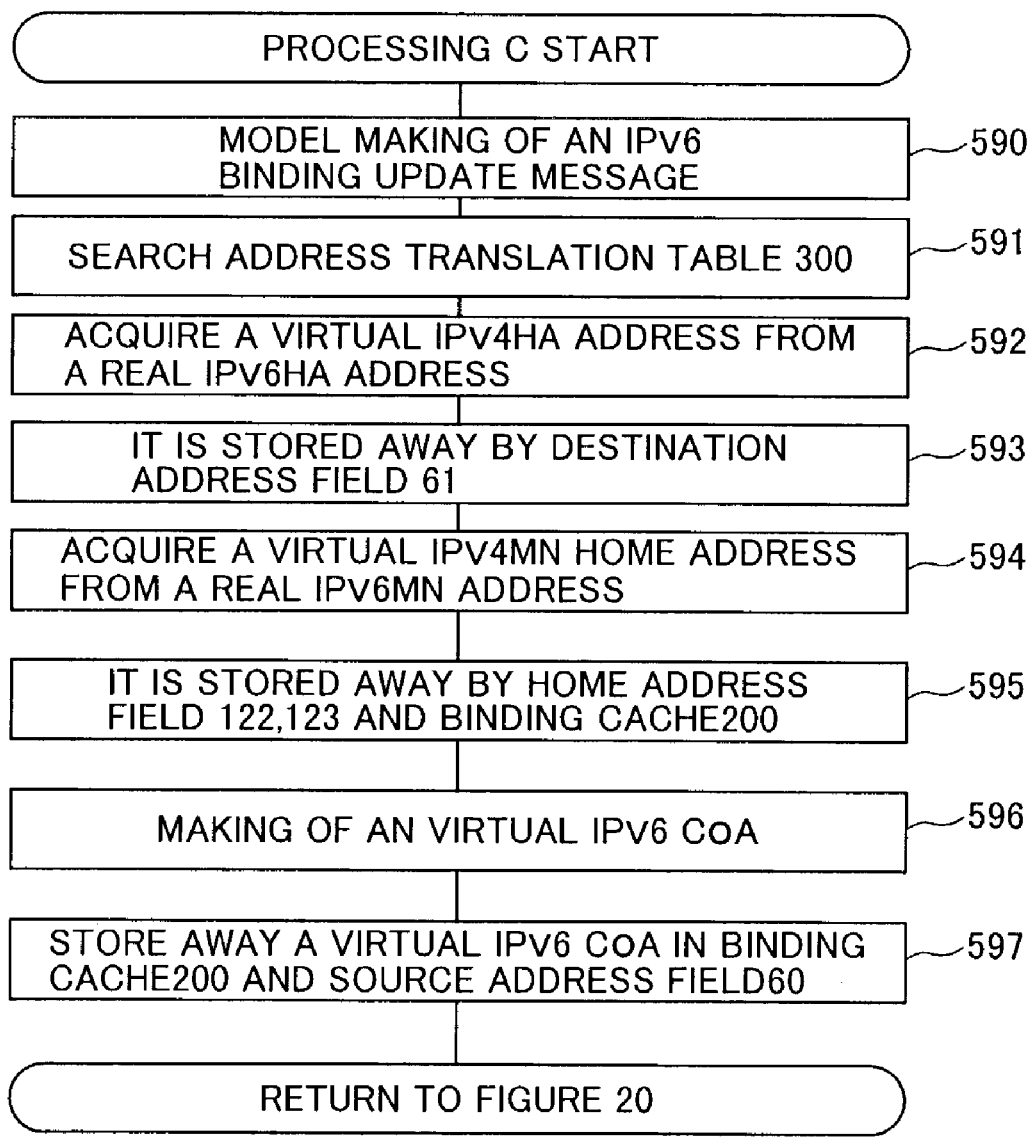
FIG. 23 is a flow diagram showing a translation routine performed by the mobile proxy apparatus 2 to convert a Mobile IPv4 Registration Request message into a Mobile IPv6 Binding Update message.

Referring to FIG. 20 and FIG. 23, a translation routine (F21) performed by the mobile proxy apparatus 2 which is opposite to the above procedure (F21), i.e., translating the Mobile IPv4 Registration Request message into the Mobile IPv6 Binding Update message, will be described here.

The Mobile IPv4 Registration Request message packet sent by the MN4b is intercepted by the mobile proxy apparatus 2, which in turn performs the operation shown in FIG. 20 on the packet, i.e., checking if the packet is an IPv4 Registration Request message (501) and proceeding to the processing shown in FIG. 23 (504). First, based on the IPv6 packet format shown in FIG. 5 and the Mobile IPv6 Binding Update message format shown in FIG. 9, a model of the IPv6 Binding Update message is created (590). Next, the address translation table 300 is looked up to perform the IP address translation (591). From the address translation table 300, a real IPv6 address of HA3 corresponding to the virtual IPv4 HA address contained in the HA Address field 133 shown in FIG. 10 is acquired (592) and stored in the Destination Address field 61 shown in FIG. 5 (593). Next, from the address translation table 300, a real IPv6 MN address of MN4b is acquired which corresponds to the virtual IPv4 MN home address contained in the MN Home Address field 132 shown in FIG. 10 (594). The acquired real IPv6 MN address of MN4b is then stored in the Home Address fields (122, 123) of FIG. 9 and in the real MN home address entry 201 of the Binding Cache 200 of FIG. 14 (595). Next, the care of address field 134 shown in FIG. 10 contains the IPv4 address of the mobile proxy. If the IPv6 address of the mobile proxy apparatus 2 is notified as a care of address to the HA3, it is impossible to determine which MN4 the Registration Reply message returned from the HA3 is destined to. To solve this problem, the mobile proxy apparatus 2 utilizes the IPv6 mapped IPv4 address structure shown in FIG. 13 to compose a virtual IPv6 care of address of the MN4 (596). To describe in more detail, a virtual IPv6 care of address of the MN4 is created by storing in the upper bits of the IPv6-over-IPv4 address structure shown in FIG. 13 an IPv6 Network Prefix that can reach the network to which the mobile proxy apparatus 2 belongs and by storing in the lower 32-bit part the virtual IPv4 MN home address contained in the Binding Update sent by the MN4b. In a final step, the composed virtual IPv6 care of address is stored in the MN care of address entry 203 of the Binding Cache 200 shown in FIG. 14 and in the Source Address field 60 shown in FIG. 5 (597). The IPv6 Binding Update message composed in the above processing is sent to the HA3 in the home network 1*a* (507), thus terminating the routine (F21) of translating the Mobile IPv4 Registration Request message into the Mobile IPv6 Binding Update message.

Returning to FIG. 16, the explanation about the location registration sequence will be continued. The Registration Request message which the mobile proxy apparatus 2 has generated through the translation of the Mobile IP message is received by the HA3 (S21). The HA3 extracts the home address and the care of address of the MN4b from the Registration Request message to create a MN4b entry in the Binding Cache 200 as shown in FIG. 14. Next, the HA3 sends a Registration Reply message to the care off address contained in the Registration Request message (S30). To intercept IP packets destined to the MN4 that are flowing into the home network 1*a*, the HA3 broadcasts a packet intercepting message (Gratuitous ARP) to the home network 1*a* (S31). Assuming that the CN-B6 in other than the home network 1*a* performs an address resolution for the MN4b before it starts communicating with the MN4b, the HA3 sends an Address Resolution Registration message to the DNS-A7 installed in the home network 1*a* to register the home address and domain name of MN4 with the DNS-A7 (S32). For the Address Resolution Registration message and the registration method, see the IETF RFC2136.

Next, the Registration Reply message that was sent in the communications protocol of the home network 1*a* (S30) is intercepted by the mobile proxy apparatus 2, which in turn performs the translation routine (F21) to convert the Registration Reply message into a Binding Acknowledgement message conforming to the protocol used in the foreign network 1*b* and forwards it to the MN4b (S22).

With reference to FIG. 20 and FIG. 21, the translation routine (F21) performed by the mobile proxy apparatus 2 to convert the Mobile IPv4 Registration Reply message into the Mobile IPv6 Binding Acknowledgement message will be described.

Figure 12:
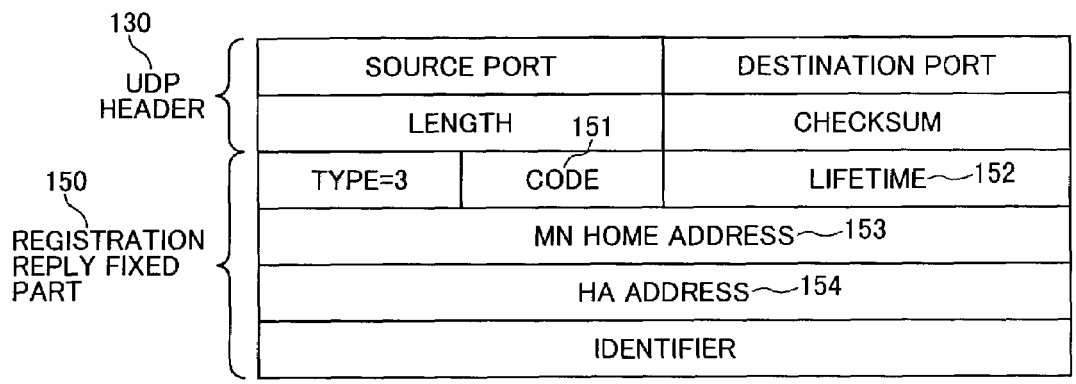
FIG. 12 illustrates a format of a Mobile IPv4 Registration Reply message.
Figure 24:
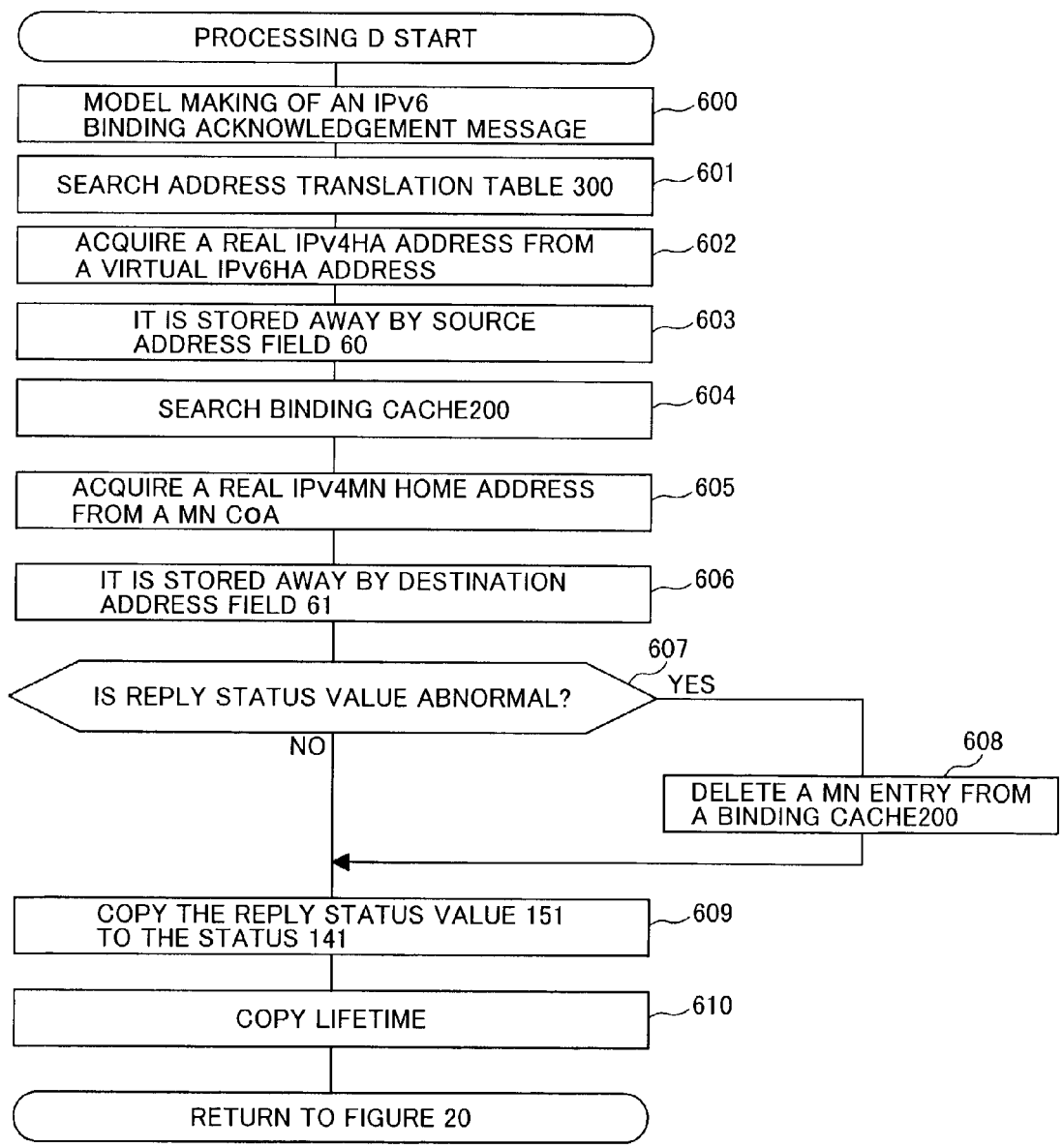
FIG. 24 is a flow diagram showing a translation routine performed by the mobile proxy apparatus 2 to convert a Mobile IPv4 Registration Reply message into a Mobile IPv6 Binding Acknowledgement message.

The Mobile IPv4 Registration Reply message packet sent by the HA3 is intercepted by the mobile proxy apparatus 2, which in turn performs the operation shown in FIG. 20 on the packet, i.e., checking if the packet is an IPv4 Registration Reply message (501) and proceeding to the processing shown in FIG. 24 (505). First, based on the IPv6 packet format shown in FIG. 5 and the Mobile IPv6 Binding Acknowledgement message format shown in FIG. 11, a model of the IPv6 Binding Acknowledgement message is created (600). Next, the address translation table 300 is looked up to perform the IP address translation (601). From the address translation table 300, a virtual IPv6 HA address corresponding to the real IPv4 HA address contained in the HA Address field 154 shown in FIG. 12 is acquired (602) and stored in the Source Address field 60 shown in FIG. 5 (603). Next, from the Binding Cache 200 shown in FIG. 14, a care of address of MN4b corresponding to the real IPv4 MN home address contained in the MN Home Address field 153 shown in FIG. 12 is acquired (605) and stored in the Destination Address field 61 of FIG. 5 (606). Next, a check is made to see if the value of a Reply Status Value 151 of FIG. 12 is abnormal (607). If the reply is abnormal, the MN4 entry is deleted from the Binding Cache 200 of FIG. 14 (608). Next, the Reply Status Value 151 and Lifetime 152 shown in FIG. 12 are copied to the Status 141 and Lifetime 142 of FIG. 11, respectively (609, 610). The IPv6 Binding Acknowledgement message created by the above processing is then sent to the MN4b (507), terminating the routine (F21) for translating the Mobile IPv4 Registration Reply message into the Mobile IPv6 Binding Acknowledgement message.

Figure 22:
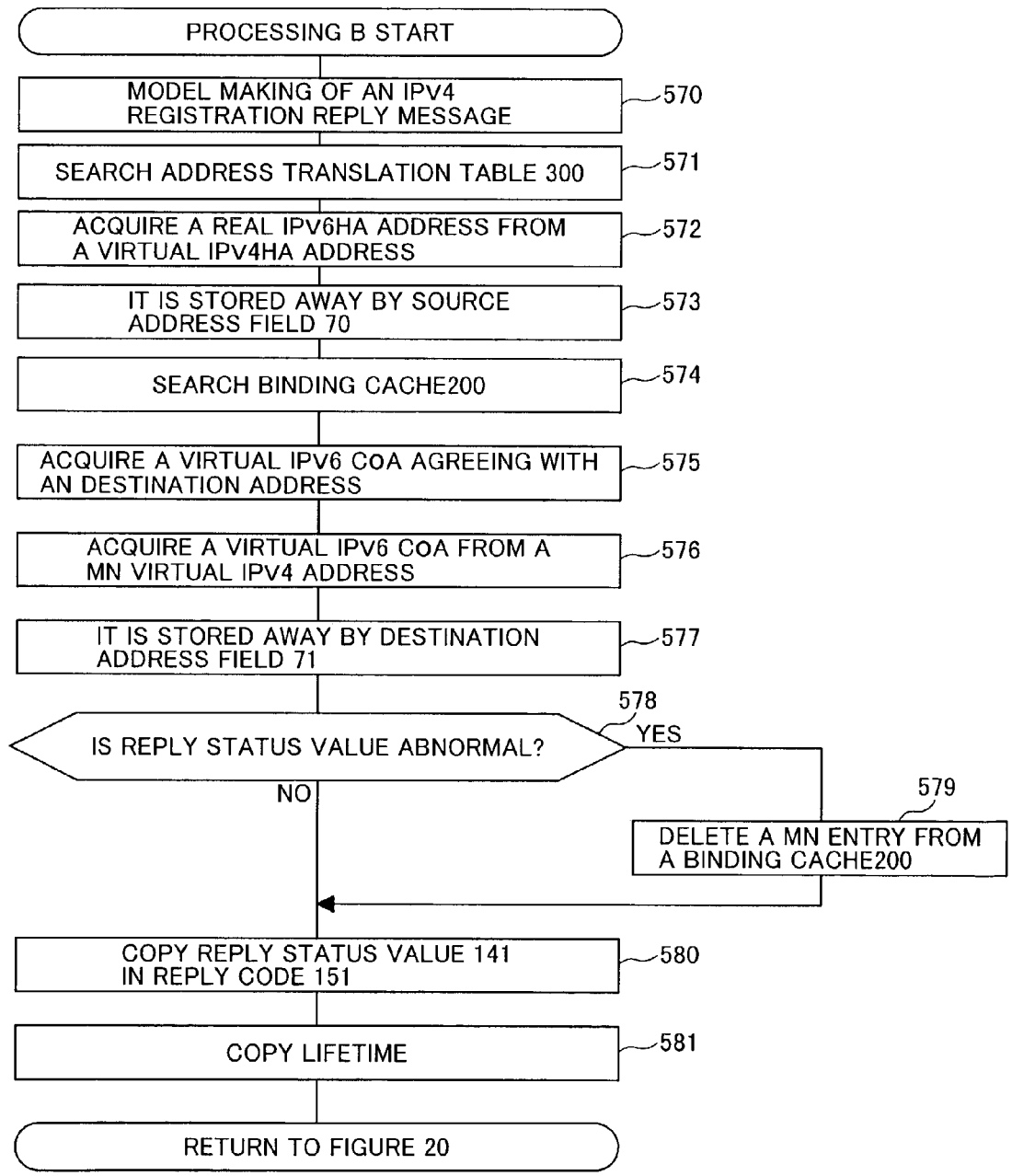
FIG. 22 is a flow diagram showing a translation routine performed by the mobile proxy apparatus 2 to convert a Mobile IPv6 Binding Acknowledgement message into a Mobile IPv4 Registration Reply message.

Referring to FIG. 20 and FIG. 22, a translation routine (F21) performed by the mobile proxy apparatus 2 which is opposite to the above procedure (F21), i.e., translating the Mobile IPv6 Binding Acknowledge message into the Mobile IPv4 Registration Reply message, will be described here. The Mobile IPv6 Binding Acknowledgement message packet sent by the HA3 is intercepted by the mobile proxy apparatus 2, which in turn performs the operation shown in FIG. 20 on the packet, i.e., checking if the packet is an IPv6 Binding Acknowledgement message (501) and proceeding to the processing shown in FIG. 22 (503). First, based on the IPv4 packet format shown in FIG. 6 and the Mobile IPv4 Registration Reply message format shown in FIG. 12, a model of the IPv4 Registration Reply message is created (570). Next, the address translation table 300 is referenced to perform the IP address translation (571). From the address translation table 300, a virtual IPv4 HA address corresponding to the real IPv6 HA address contained in the Source Address field 60 shown in FIG. 5 is acquired (572) and stored in the Source Address field 70 shown in FIG. 6 (573). Next, the Binding Cache 200 shown in FIG. 14 is referenced (574) to pick up a virtual IPv4 care of address that matches the destination address contained in the Destination Address field 61 of FIG. 5 (575). Next, the Binding Cache 200 is referenced again to acquire a virtual IPv4 MN address corresponding to the virtual IPv6 care of address (576), which is then stored in the Destination Address field 71 of FIG. 6 (577). Next, a check is made to see if the value of a Reply Status 141 of FIG. 11 is abnormal (578). If the reply is abnormal, the MN4 entry is deleted from the Binding Cache 200 of FIG. 14 (579). Next, the Status 141 and Lifetime 142 shown in FIG. 11 are copied to the Reply Status Value 151 and Lifetime 152 of FIG. 12, respectively (580, 581). The IPv6 Binding Acknowledgement message created by the above processing is then sent to the MN4b (507), terminating the routine (F21) for translating the Mobile IPv6 Binding Acknowledgement message into the Mobile IPv4 Registration Reply message.

Returning to FIG. 16, the explanation about the location registration sequence will be continued. After performing the Mobile IP message translation and sending the Binding Acknowledgement message to the MN4b, the mobile proxy apparatus 2 completes the Binding Cache 200 shown in FIG. 14 (F22). Further, the mobile proxy apparatus 2 may also send an Address Resolution Registration message to the DNS-B8 installed in the foreign network 1*b* to register the virtual home address and domain name by which the MN4b can be recognized in the foreign network 1*b* (S23). Thus, when the CN-B6 present in the foreign network 1*b* performs an address resolution for the MN4b using the DNS-B8 before communicating with the MN4b, the virtual home address of MN4b is returned in the address resolution reply, realizing a route optimization in the foreign network 1*b*.

In the above we have discussed the sequence of operations performed when the MN4b registers its location with the HA3 in the home network 1*a*. In the following we will describe a communication sequence when the CN-A5 and CN-B6, the correspondent nodes communicating with the MN4b, send packets to the MN4b.

Figure 17:
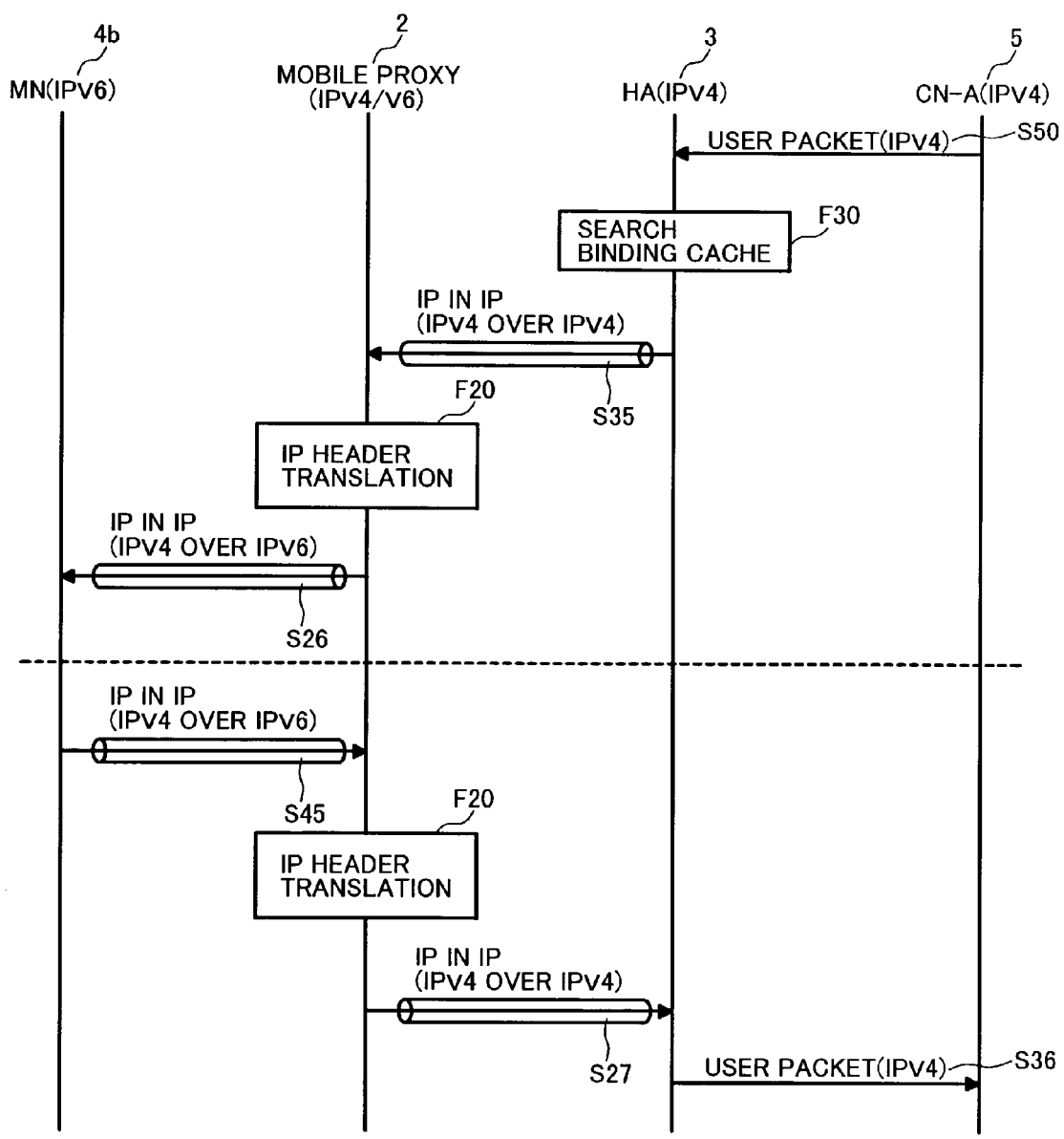
FIG. 17 illustrates a sequence performed when CN-A5 present in a home network 1a communicates with MN4b that has moved to a foreign network 1b away from home.

FIG. 17 shows a sequence when the CN-A5 present in the home network 1*a* communicates with the MN4b that has moved to the foreign network 1*b*. A user packet sent from the CN-A5 to a real IPv4 home address of MN4 is intercepted by the HA3 (S50). The HA3 looks up the Binding Cache 200 shown in FIG. 14 to extract an IPv4 care of address corresponding to the real IPv4 home address of MN4. The HA3 creates an IPv4 header that uses the IPv4 care of address of MN4b and the IPv4 address of HA3 as the destination address and the source address, respectively. The HA3 encapsulates the user packet received from the CN-A5 by adding the IPv4 header thus composed and forwards the encapsulated packet (S35).

Next, the mobile proxy apparatus 2 intercepts the encapsulated packet and performs an IP header translation routine (F20) of FIG. 19 on the outer IPv4 header. As a result, the encapsulated packet sent from the CN-A5 to the real IPv4 home address of MN4 is converted into an IPv4-over-IPv6 encapsulated packet which contains a real IPv6 care of address of MN4b and a virtual IPv6 HA address of HA3 as the destination address and the source address, respectively. The IPv4-over-IPv6 encapsulated packet is then forwarded to the MN4b that moved to the foreign network 1b. Upon receiving the IPv4-over-IPv6 encapsulated packet, the MN4b removes the outer IPv6 header to recover the original IPv4 packet.

Similarly, when the MN4b sends a packet to the CN-A5 present in the home network 1a, the procedure described above is reversed. The IPv4-over-IPv6 encapsulated packet sent from the MN4b (S45) is processed by the IP header translation routine (F20) of the mobile proxy apparatus 2 whereby it is converted into an IPv4 encapsulated packet for transmission (S27) to the HA3. The HA3 then decapsulates the received packet so that the CN-A5 can receive the original packet (S36).

Figure 18:
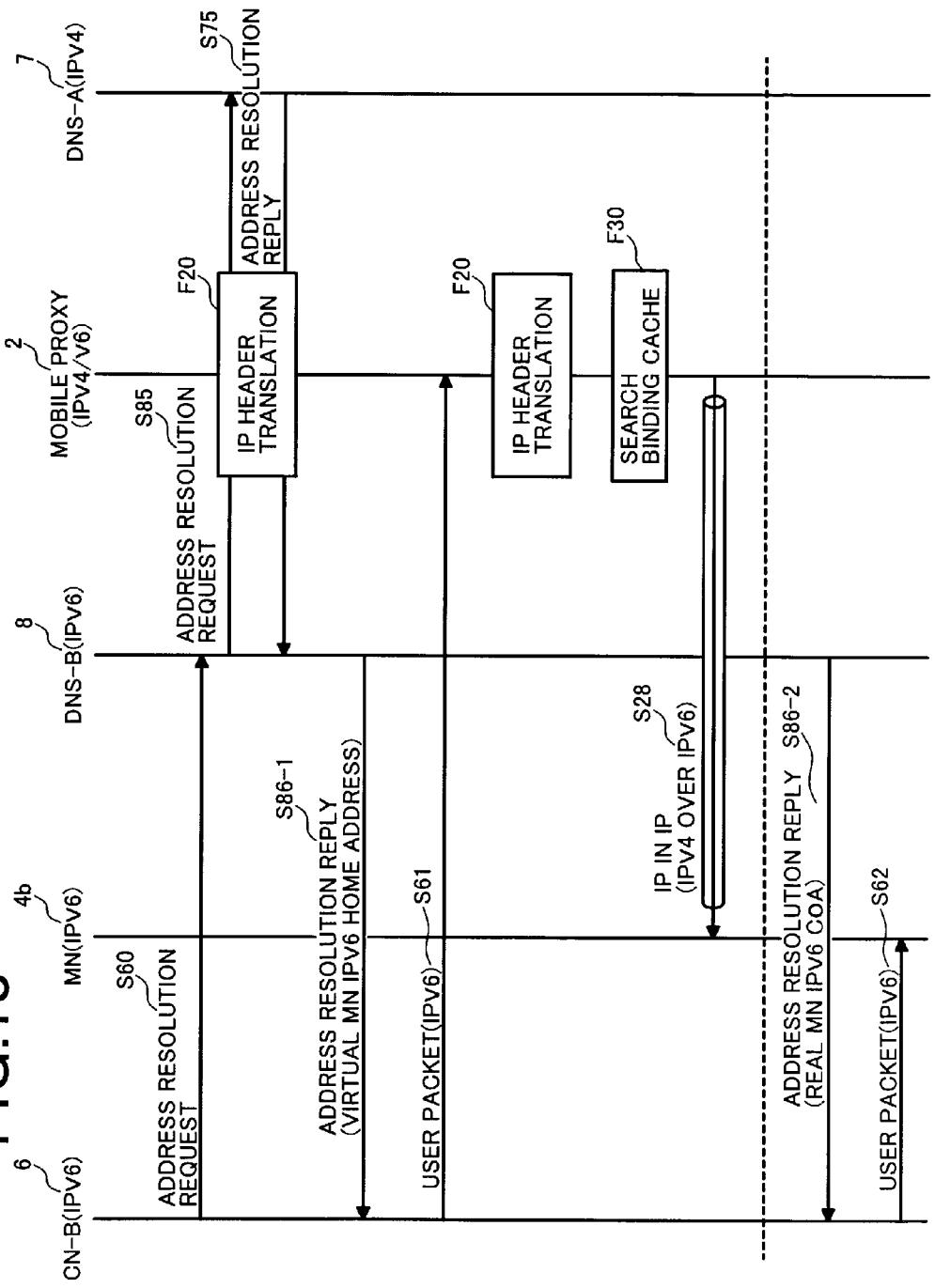
FIG. 18 illustrates a sequence performed when CN-B6 present in the foreign network 1b communicates with MN4b that has moved to the foreign network 1b.

Next, with reference to FIG. 18, a sequence executed when the CN-B6 present in a foreign network 1b communicates with the MN4b that has entered the same network 1b. First, the CN-B6 sends the DNS-B8 an Address Resolution Request using the domain name of MN4 to acquire a virtual IPv6 address of MN4 that is valid in the foreign network 1b (S60). The DNS-B8 the Address Resolution Request to the DNS-A7 (S85). The DNS-A7 sends the Address Resolution Reply containing the real IPv4 address of MN4 to the DNS-B8 (S75). At this time, the mobile proxy apparatus 2 intercepts address resolution exchanges and performs the IP header translation routine (F20) on the address resolution request and reply. The DNS-B8 returns the virtual IPv6 home address of MN4b translated by the mobile proxy apparatus 2 to the CN-B6 (S86-1). The CN-B6 transmits a user packet that contains the received virtual IPv6 home address of MN4b as a destination address (S61).

Normally, in the Mobile IP, packets destined to the home address need to be sent to the HA. However, in the network configuration of this invention in which communications are conducted between two networks and in which there is a translator and a firewall (FW) between the networks or virtual private networks (VPNs) are constructed, there is an increased possibility of packet routing delay and packet loss as well as redundant packet routing.

The use of the Binding Cache 200 stored in the mobile proxy apparatus 2 of this invention can optimize the routing in the local network. More specifically, the user packet sent from the DNS-B6 to the virtual IPv6 home address of MN4b (S61) is intercepted by the mobile proxy apparatus 2. The mobile proxy apparatus 2 performs the IP header translation routine (F20). This creates a virtual IPv4 address of CN-B6 in the address translation table 300 and the original user packet is converted into an IPv4 user packet that contains the real IPv4 address of MN4 and the virtual IPv4 address of CN-B6 as the destination address and the source address. Next, the translation routine looks up the Binding Cache 200 and acquires a real IPv6 care of address of MN4 corresponding to the real home address of MN4. As a result, it is possible to compose an IPv4-over-IPv6 packet by using the real IPv6 care of address of MN4 as a destination address and forward it in an optimum route to the MN4b.

Further, the following method may be used for route optimization in the local network. In the sequence of FIG. 18, when the mobile proxy apparatus 2 transfers the Address Resolution Reply to the DNS-B8, it normally returns a virtual home address of MN4b. If at this time by looking up the Binding Cache 200 the mobile proxy apparatus 2 finds that the cache holds a real IPv6 care of address corresponding to the real home address of MN4b, the mobile proxy apparatus 2 returns this address to the CN-B6 (S86-2), permitting the CN-B6 to directly send the user packet to the MN4b.

As is apparent from the foregoing description, installing the mobile proxy apparatus 2 between networks conforming to different communications protocols or address systems enables the MN4 to inform the HA3 in the home network of the location registration message, thus expanding the range of mobility. It also has an advantage of being able to facilitate the transit from the Mobile IPv4 to the Mobile IPv6.

Further, by combining the DNS apparatuses 7, 8 with the mobile proxy apparatus 2 and providing the Binding Cache also in the mobile proxy apparatus 2, it is possible establish an optimum route to and from the MN4b in the local network. This in turn improves a utilization of network resources and helps distribute the load of the HA3.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A mobile proxy apparatus including a protocol translator interconnecting a network A conforming to a protocol P and a network B conforming to a protocol Q, the protocol translator having:

an address translation function to perform a conversion between an address conforming to the communications protocol P and an address conforming to the communications protocol Q;

a detection function to detect a communication conforming to a particular protocol;

a format translation function to convert a particular protocol between a format identifiable in the network A and a format identifiable in the network B; and a function to process a communication conforming to a mobile communications protocol;

wherein, when a terminal M belonging to the network A moves to the network B, a protocol exchanged between a server H which manages location information of the terminal M in the network A and the terminal M is converted between a format valid in one of the networks and a format valid in the other network and relayed between the networks by using the address translation function and the format translation function, and wherein the mobile proxy apparatus registers a virtual home address and a domain name into a DNS server installed in the network B, the virtual home address and the domain name being recognized by a mobile node in the network B.

2. The mobile proxy apparatus according to claim 1, further including:
- a function to extract address information contained in the protocol exchanged between the network A and the network B by using the detection function of detecting a communication conforming to a particular protocol; and
- a function to dynamically create an address V valid in the network A and an address W valid in the network B, the addresses being used by a sending terminal and a receiving terminal M;
- wherein an association between the extracted address information and the dynamically created addresses has address translation information containing lifetime information and, in subsequent communications, the address conversion is executed according to the address translation information and the converted addresses are relayed.

3. The mobile proxy apparatus according to claim 2, wherein the address information includes a real home address of the terminal M used in the network A, a virtual home address of the terminal M valid in the network B and a care of address of the terminal M valid in the network B.

4. The mobile proxy apparatus according to claim 1, wherein after the terminal M has moved to the network B from the network A conforming to the protocol P, when an address acquisition protocol for the terminal M is dispatched from a terminal C present in the network B conforming to the protocol Q, an address conforming to the protocol Q which corresponds to an address of the terminal M valid in the network A conforming to the protocol P is informed to the terminal C so that a communication from the terminal C can directly be routed to the terminal M in the network B conforming to the protocol Q.

5. The mobile proxy apparatus according to claim 1, further including:
- a function to encapsulate communication data; and
- a function to decapsulate the encapsulated data;
- wherein the mobile proxy apparatus decapsulates encapsulated communication data sent from the network A and conforming to the protocol P, converts both inner and outer communication data into addresses valid in the network B conforming to the protocol Q, and encapsulates again the converted communication data for relaying.

6. The mobile proxy apparatus according to claim 1, wherein the terminal M belonging to the network A, when moving to the network B, creates address information valid in the network B and containing an address of the terminal M valid in the network A, extracts the address of the terminal M valid in the network A from the address information and relays it to the server H managing the location information in the network.

7. The mobile proxy apparatus according to claim 1, further including:
- a particular protocol information creation function to create format information on a particular protocol provided by an external device; and
- an external device setting function to inform a connected external device of the created information;
- wherein, upon receiving a mobile communications protocol communicated between the terminal M that has moved from the network A to the network B and the server H present in the network A and managing the location information, the mobile proxy apparatus creates, from information included in the mobile communications protocol, format information on a particular protocol provided by an external device and informs it to the external device.

8. The mobile proxy apparatus according to claim 1, wherein the mobile communications protocol is a Mobile IP.

9. The mobile proxy apparatus according to claim 1, wherein the network A to which the terminal M belongs is a network conforming to an IPv4 protocol and the network B to which the terminal M moves is a network conforming to an IPv6 protocol.

10. The mobile proxy apparatus according to claim 1, wherein the network A to which the terminal M belongs is a network conforming to an IPv6 protocol and the network B to which the terminal M moves is a network conforming to an IPv4 protocol.

11. The mobile proxy apparatus according to claim 1, wherein the terminal M includes
- a function to perform processing according to a Mobile IPv4 and a Mobile IPv6 and
- a function to identify a protocol governing the network to which a mobile terminal has moved, and
- wherein the terminal M identifies a protocol of the network to which it has moved from a protocol of a router advertisement which it receives in the visited local network, and sends a location registration conforming to the visited local network.

12. A mobile communication method for interconnecting a network A conforming to a protocol P and a network B conforming to a protocol Q, comprising the steps of:
- performing a conversion between an address conforming to the communications protocol P and an address conforming to the communications protocol Q;
- detecting a communication conforming to a particular protocol;
- converting a particular protocol between a format identifiable in the network A and a format identifiable in the network B; and
- processing a communication conforming to a mobile communications protocol;
- wherein, when a terminal M belonging to the network A moves to the network B, a protocol exchanged between a server H managing location information of the terminal M in the network A and the terminal M is converted between a format valid in one of the networks and a format valid in the other network and relayed between the networks by using the address translation function and the format translation function, and
- wherein the mobile proxy apparatus registers a virtual home address and a domain name into a DNS server installed in the network B, the virtual home address and the domain name being recognized by a mobile node in the network B.

* * * * *